United States Patent
Tao et al.

(10) Patent No.: US 10,202,190 B2
(45) Date of Patent: Feb. 12, 2019

(54) METHOD AND SYSTEM FOR DESIGNING COOPERATIVELY-DRIVEN AIRCRAFT SYSTEM

(71) Applicant: Wenying Tao, Anshun (CN)

(72) Inventors: Wenying Tao, Anshun (CN); Shaowen Yang, Anshun (CN)

(73) Assignee: Wenying Tao, Anshun (CN)

( * ) Notice: Subject to any disclaimer, the term of this patent is extended or adjusted under 35 U.S.C. 154(b) by 0 days.

(21) Appl. No.: 15/747,439

(22) PCT Filed: Jul. 22, 2016

(86) PCT No.: PCT/CN2016/090948
§ 371 (c)(1),
(2) Date: Jun. 22, 2018

(87) PCT Pub. No.: WO2017/016439
PCT Pub. Date: Feb. 2, 2017

(65) Prior Publication Data
US 2018/0281948 A1    Oct. 4, 2018

(30) Foreign Application Priority Data

Jul. 24, 2015    (CN) .......................... 2015 1 0438906

(51) Int. Cl.
*G08G 5/00*    (2006.01)
*B64C 39/02*    (2006.01)
(Continued)

(52) U.S. Cl.
CPC .......... *B64C 39/024* (2013.01); *G05B 19/048* (2013.01); *G08G 5/00* (2013.01);
(Continued)

(58) Field of Classification Search
CPC ............ B64C 39/024; B64C 2201/145; G08G 5/0013; H04B 7/185; G05D 1/0011
See application file for complete search history.

(56) References Cited

U.S. PATENT DOCUMENTS 6,739,556 B1    5/2004  Langston
7,120,521 B2 *  10/2006  Lilley ................ B64D 45/0015
                                                          701/3
(Continued)

FOREIGN PATENT DOCUMENTS

CN        202282078 U      6/2012
CN        102914991 A      2/2013
(Continued)

*Primary Examiner* — Michael J Zanelli
(74) *Attorney, Agent, or Firm* — Gokalp Bayramoglu

(57) ABSTRACT

A method and system for designing a cooperatively-driven aircraft system. A cooperatively-driven aircraft system comprises an aircraft, a movable ground monitor station or a fixed ground monitor station, a data link of a composite data chain, and a relay communication device. A flight management system is disposed inside the aircraft. The aircraft is connected to the movable ground monitor station or the fixed ground monitor station by means of the radio data link of the composite data chain. Telemetering data information about the flight management system is issued to the movable ground monitor station or the fixed ground monitor station by means of the composite data chain. A manned aircraft technology and an unmanned aerial vehicle system technology are combined, cooperative air and ground driving is constructed, and a new technology aircraft system integrating easy flight and safe flight is provided.

8 Claims, 7 Drawing Sheets

(51) Int. Cl.
  *H04B 7/185* (2006.01)
  *G05B 19/048* (2006.01)
(52) U.S. Cl.
  CPC ........... *G08G 5/0013* (2013.01); *H04B 7/185* (2013.01); *B64C 2201/145* (2013.01)

(56) References Cited

U.S. PATENT DOCUMENTS

| | | | | |
|---|---|---|---|---|
| 8,255,098 | B2* | 8/2012 | Jones | B64C 13/18 244/76 R |
| 8,527,118 | B2* | 9/2013 | Jones | G01C 23/00 244/76 R |
| 2012/0072058 | A1* | 3/2012 | Regmi | B64C 39/024 701/3 |
| 2016/0124429 | A1* | 5/2016 | Schultz | B64C 13/503 701/2 |

FOREIGN PATENT DOCUMENTS

| | | |
|---|---|---|
| CN | 102946417 A | 2/2013 |
| CN | 103873133 A | 6/2014 |
| CN | 204013537 U | 12/2014 |
| CN | 105096662 A | 11/2015 |
| CN | 205050359 U | 2/2016 |
| EP | 2375299 A1 | 10/2011 |

* cited by examiner

METHOD AND SYSTEM FOR DESIGNING COOPERATIVELY-DRIVEN AIRCRAFT SYSTEM

CROSS REFERENCE TO RELATED APPLICATIONS

This application is the national phase entry of International Application PCT/CN2016/090948, filed on Jul. 22, 2016, which is based upon and claims priority to Chinese Patent Application No. 201510438906.6, filed on Jul. 24, 2015, the entire contents of which are incorporated herein by reference.

TECHNICAL FIELD

The present invention relates to an aircraft which is between a manned aircraft and an unmanned aerial vehicle system and is integrated as a new aircraft system, it belongs to an aerial technical field.

BACKGROUND

In the current manned aircraft technology, an aircraft pilot is the center, main characteristics thereof are: 1. an airplane takes off, a main pilot or an aircraft commander on board is responsible for the air crew and the air safety with full authority; 2. during takeoff of the airplane, the ground and the approach tower cooperate and implement decisions made by the aircraft commander; 3. after takeoff of the airplane, the ground has no means of forcibly managing and controlling the flight. Therefore, the condition during the flight of the airplane largely depends on the aircraft pilot's unilateral judgement and manipulation, and if unsafe factors of the aircraft pilot are introduced, the air safety problem of the aircraft becomes too complex to be handled, wherein the factors include the aircraft pilot's accidental fault, physical health, flight subjective motivation, etc. Letting the ground monitor personnel have positive functions of managing and controlling, supplementing, replacing, etc, with respect to the air flight, will improve air safety.

Development of the unmanned aerial vehicle system shows advanceness and reasonability of the unmanned system technology. In the air, the unmanned aerial vehicle has already achieved automatic takeoff, automatic flight path flight, automatic anti-collision, flight path high accuracy control, flight path reset, automatic landing and go-around, with high accuracy and with high reliability, and the flight of the unmanned aerial vehicle may deal with complex weather, also has safe takeoff and landing control under various complex airport conditions. On the ground, a ground monitor station has already been able to monitor the flight of the unmanned aerial vehicle continuously in a line of sight or over-the-horizon range and adjust the flight path at any time, can deal with a flight special case in time, and can implement the manual remote control flight of the unmanned aerial vehicle from the ground, the condition and data of the flight can provide a real time alarm on the ground and be recorded. The flight control method of the unmanned aerial vehicle is different from that of the manned aerial vehicle, its flight path needs to be generated in advance, or be generated rapidly temporarily, the use method is not flexible, still a program is first written, and then it is loaded into the unmanned aerial vehicle system for use. This is a typical man machine control flow, i.e. a man writes a program for a machine, then the machine works by the program, there is always an obvious time interval. The characteristic of the flight path generated by the manned flight is "think and fly, then generate" the flight path. The technology of the new aircraft system may preliminarily achieve a plurality of automatic flight path generation methods, and can achieve flexibility and safety of the flight better when combined with the manned flight.

SUMMARY

The object of the present invention is to provide a method and system for designing a cooperatively-driven aircraft system, a manned aircraft technology and an unmanned aerial vehicle system technology are combined, cooperative air and ground driving is constructed, and a new technology aircraft system of easy flight and safe flight is provided.

The technical solutions of the present invention are as follows:

A method for designing a cooperatively-driven aircraft system of the present invention is as follows: apparatuses of the aircraft and the ground which monitor and control the flight, together form a new type of aircraft system which has complete information and control functions between air and ground, the whole system may be divided into three parts. one is the aircraft, the aircraft is configured with a telex manipulation system for a pilot. The pilot may use the telex manipulation system to fly the aircraft, the telex manipulation system has a flight management system as the center, is responsible for integrating a telex manipulator, a parameter sensor and a control execution system, provides various control modes of performing the flight for the pilot, in order for the pilot to drive easily, and achieves an automatic flight independent of the pilot's sense, improves air safety. Meanwhile, as a flight task management system, the flight management system has a complete function of providing automatic flight control for the aircraft, therefore, may provide the use of performing the flight in the automatic mode for the pilot on-board, and the flight management computer of the flight management system is also used for the telex manipulation system, achieves a conversion channel between a manual mode and an automatic mode. one is a ground monitor and control system, abbreviated as a ground monitor station, is a working environment in which the monitor personnel perform monitoring and control of the flight of the aircraft by a data link and corresponding apparatuses. one is the data link which connects the aircraft with the ground monitor station, i.e. a telemetering remote control and information transmission system, is a radio link which provides control instruction or data information linkage between air and ground, includes content of information, control and communication, etc. the cooperatively-driven aircraft system of the present invention formed by the aircraft and the ground monitor station together, abbreviated as a cooperatively-driven aircraft or a cooperatively-driven airplane, may provide a plurality of control modes of performing the flight for the on-board pilot, including a control level as well as a manual mode, a semi-automatic mode and an automatic mode on-board, the monitor personnel of the ground monitor station may also do not depend on the on-board pilot, and perform a plurality of selectable flight control modes, also including the manual mode, the semi-automatic mode and the automatic mode.

I.e.:

A method for designing a cooperatively-driven aircraft system, wherein: apparatuses of the aircraft and the ground which monitor and control the flight, together form the aircraft system which has complete information and control functions between air and ground; the whole system may be divided into three parts: one is the aircraft, the aircraft is configured with a telex manipulation system for a pilot, the pilot uses the telex manipulation system to fly the aircraft, the telex manipulation system has a flight management system as the center, is responsible for integrating a telex manipulator, a parameter sensor and a control execution system, provides different control modes of performing the flight for the pilot, and achieves an automatic flight independent of the pilot's sense; the flight management system is a flight task management computer system, achieves a complete function of providing automatic flight control for the aircraft, a flight management computer of the flight management system is also used for the telex manipulation system, achieves a conversion channel between a manual mode and an automatic mode; one is a ground monitor and control system, is a working environment in which the monitor personnel perform monitoring and control of the flight of the aircraft by a data link and corresponding apparatuses; one is the data link which connects the aircraft with the ground monitor station, is a radio link which provides control instruction or data information linkage between air and ground; the cooperatively-driven aircraft system formed by the aircraft and the ground monitor station together provides different control modes of performing the flight for the on-board pilot, including a manual mode, a semi-automatic mode and an automatic mode on-board, the monitor personnel of the ground monitor station are able to not depend on the on-board pilot, and perform a selectable flight control mode, also including the manual mode, the semi-automatic mode and the automatic mode.

wherein, in the flight management system, data chain connection with the ground monitor station is constructed, the control levels are introduced to provide control laws for the flight management system to control its combination control object; three convertible control modes, i.e. manual control, semi-automatic control and automatic control, are set for the flight management system, so that different driving methods are provided for the pilot; when the manual mode is selected for the flight management system, the flight management system becomes a telex manipulation system, and when the semi-automatic mode and the automatic mode are selected, the flight management system becomes a task management system;

all of the three control modes achieve combination control of the control object by means of the flight management system; one implementation method is, the ground monitor personnel predetermine a control level for the flight management system, the on-board pilot may not change the control level, but may select a control mode, so that in accordance with control data given by the pilot and sensor subsystem data information, the flight management system may cooperate to implement and achieve a corresponding control process on the connected combination control object according to a control law given by the control level and a control function thereof;

the use of the telex manipulator is a method of the manual mode; the allowed amount of deviation is limited by a flight range; when the deviation reaches a limit and is maintained, the deviated flight path will go in the same direction and at the same altitude and at an equal distance, relative to the predetermined flight path; design correction adjustment and control may correct a case where the aircraft deviates from the predetermined flight path in the automatic flight by use of a manipulation method of manually manipulating the telex manipulator or a control key, one manipulation generates one correction instruction corresponding to one adjustment quantity of the heading, and according to specific pneumatic characteristics of the aircraft as well as pulse duration time of the instruction, the heading correction amount generated by one correction instruction may be determined; one key-press or a re-manipulation of the telex manipulator after it returns to the middle generates a new correction instruction, the correction amount accumulated for consecutive several times may achieve a large change in the heading, and the correction of the heading may achieve the correction of the flight path deviation; a range of the heading correction amount allowed by the accumulation may be set.

wherein, the flight range is executable control data, is an airspace range indicated by geographic coordinates, beyond which the aircraft is not allowed to fly; by data information of the navigation monitor system, the flight management system identifies and limits the flight range in the flight; the flight range includes an flight path range and an airspace range, the flight path range is a certain width and height range set with respect to the flight path, numerical values may be relatively fixed, and may be denoted by relative coordinates with geographic coordinates of the flight path being used as a reference, may be used as a safety interval for planning the flight path, may also be used as a range of adjustment and control by the pilot on the flight path or remote control by the ground monitor personnel; the airspace range is limitation on all width and height ranges denoted by geographic coordinates in the flight, is set with respect to each flight, or set and relatively fixed with respect to training around the airport, regular field operations or a traffic flight path flight airspace;

the ground personnel predetermine the flight range for the flight management system; the flight range can not be modified by the on-board personnel, and in the flight, can only be modified by the ground monitor station at the original takeoff place;

the flight range has priority over the on-board manual mode, the semi-automatic mode and the automatic mode in the control power, one is that all flight paths are not allowed to fly beyond the flight range, and when the predetermined flight path is performed, if there is a plan that is beyond the flight range, this will be prompted and refused by the system, one is that, in the execution, when the flight approaches the flight range, the flight management system automatically gives a prompt or an alarm, one is that when the flight reaches the flight range, the flight management system automatically evades according to a predetermined evasion heading or velocity, controls the aircraft to return within the flight range to perform a holding flight, or automatically perform a homeward voyage.

Furthermore, by setting the control range and setting mutual communication between the aircraft and the ground monitor station of its control range, a mutual communication and interoperation relation is constructed between the control range and the aircraft, and by mutual communication of the control range, the transmission relation with the ground monitor station is constructed, over-the-horizon networking measurement and control and communication of the aircraft is achieved;

when the aircraft flies from one control range into another adjacent control range, after the on-board composite data chain of the aircraft exits the boundaries of the original control range, the composite data chain starts to establish a measurement and control connection with a ground monitor station within the new control range, or called selective mutual communication, the previous ground monitor station interrupts mutual communication with the aircraft;

when the aircraft flight space extends beyond the control range and does not extend into the new control range, as long as the antenna of the composite data chain has controllable level strength with respect to the aircraft, it is still possible to continue measuring and controlling the aircraft until the aircraft enters other already set control range, and a ground monitor station within the new control range airspace performs measurement and control connection with the aircraft; when the aircraft flies within an airspace with no control range being set and no new ground monitor station connects and measures and controls after a set delay time, the ground monitor station of the original takeoff place may re-determine the delay time, or extend the control range into the flight airspace of the aircraft, the aircraft still receives measurement and control from the ground monitor station of the previous control range, or performs a process according to a predetermined emergency scheme, including the aircraft automatically performing homeward voyage;

by setting the control range, priorities with respect to measurement and control of the aircraft and relay leaps of measurement and control between ground monitor stations of adjacent control ranges are established, thereby forming a method of mutual communication and interoperation; such a method of applying control ranges in combination between the aircraft and the ground monitor stations determines establishment of a mutual communication and interoperation relation between the ground monitor stations with the same performance and one or more aircrafts, it is possible to construct an application of a multi-leap over-the-horizon data chain at a ground monitor station at a long distance.

A cooperatively-driven aircraft system, wherein: the cooperatively-driven aircraft system comprises an aircraft (1), a movable ground monitor station (2) or a fixed ground monitor station (3), a data link (4) of a telemetering remote control and information transmission system or abbreviated as a composite data chain and a relay communication device (5); a flight management system is disposed inside the aircraft (1), the pilot uses the telex manipulation system to perform the flight, the flight management system performs automatic control of the flight in a signal activation way or in a flight task management way; the aircraft (1) is connected to the movable ground monitor station (2) or the fixed ground monitor station (3) by means of the radio data link (4) of the composite data chain, telemetering data information about the flight management system is issued to the movable ground monitor station (2) or the fixed ground monitor station (3) by means of the composite data chain, so that the ground monitor station can monitor the flight data or state of the aircraft (1); by means of the data link (4) of the composite data chain, the movable ground monitor station (2) or the fixed ground monitor station (3) uploads control instructions or an executable predetermined flight path to the flight management system of the aircraft (1) to perform control of the flight of the aircraft (1), achieves cooperative air and ground driving; a plurality of movable ground monitor stations (2) or fixed ground monitor stations (3) may be connected in a ground wired connection way, or by means of the radio data link (4) of the composite data chain, to form a mutually communicated network system; the composite data chains (4) of the aircraft (1) are allowed to open data communication which connects them, forming a data sharing local area network.

The flight management system is the central system of the on-board system of the aircraft (1), is formed by a computer and a control apparatus; the flight management computer and units thereof in the flight management system are connected with the on-board system of the aircraft according to the following classification, to form a main operation system with mutual input and feedback;

one is that the flight management computer and units thereof in the flight management system are connected with a navigation monitor system, an engine parameter sensor and an undercarriage/airplane wheel parameter sensor as parameter sensor subsystems, to obtain input of data information of relevant monitoring parameters;

one is that the flight management computer and units thereof in the flight management system are connected with the composite data chain and a cabin integrated avionic system as monitor/manipulation subsystems, so that relevant data information and control data are communicated with each other for being displayed and operated on the aircraft, or are issued to the ground monitor station for use by the monitor personnel;

one is that the flight management computer and units thereof in the flight management system are connected with a flight control system, a thrust control system and a takeoff and landing control system as execution subsystems, wherein they output control data, perform control of corresponding control objects, the flight management computer and units thereof may be used in combination with the computer of the flight control system to use on-board computer resources reasonably;

one is that, units of the flight management computer in the flight management system, including an option display component or a control display component CDU, are on-board apparatuses or easily detachable mobile apparatuses, are human machine interaction interfaces for the pilot and the flight management computer, provide functions of displaying, inputting and modifying data or instructions.

wherein, subsystems integrated in the navigation monitor system comprise a navigation system, an automatic dependent surveillance-broadcast ADS-B and air-traffic-control responding system, a voice communication system, a ground and air communication radio system and a ground landing guide on-board system; wherein: the navigation system provides navigation data for the flight management system, integrating satellite and inertia combination navigation, satellite difference navigation, radio navigation of the composite data chain, an atmosphere data computer system, an attitude sensor, astronomy navigation and ground landing guidance, so that the flight management computer calculates navigation data;

the automatic dependent surveillance-broadcast ADS-B or air-traffic-control responding system is connected with the flight management system, on the one hand, the automatic dependent surveillance-broadcast ADS-B or air-traffic-control responding system sends real time data information to the cabin integrated avionic system, that data information may be displayed, give an alarm, or be recorded, meanwhile, by means of its own data chain, that data information is directly sent to a ground control area for being monitored and managed and controlled by a ground controller; or by means of line of sight or over-the-horizon link encoding of the on-board composite data chain, that data information is sent to the ground monitor station, and displays received navigation states of other airplanes around the present aircraft (1); on the other hand, data information of the automatic dependent surveillance-broadcast ADS-B or air-traffic-control responding system is used to obtain dangerous states in which other airplanes nearby approach the present airplane, the flight management system calculates an air anti-collision strategy of the aircraft (1) and an evasion flight path, establishes the control ability of air anti-collision of the present airplane, forms control laws of air automatic anti-collision of the present airplane;

the voice communication system communicates with a ground control area voice radio by an on-board voice radio through voice encoding via the line of sight or over-the-horizon link of the composite data chain, the line of sight or over-the-horizon link of the on-station composite data chain performs voice encoding correspondingly, so that the ground monitor station can perform voice communication with the ground control area or the ground monitor station along the way, with the flight of the aircraft (1);

the on-board ground and air communication radio system communicates with the ground independently; light of the ground and air communication radio system or navigation indicates that the system is connected with the flight management system;

a ground landing guide system built at the airport works as a landing backup system of the aircraft (1), improving security.

wherein, the composite data chain connected with the aircraft (1) is divided into two parts of an on-board composite data chain and an on-station composite data chain, and they are connected together through a radio link, the on-board composite data chain is connected with the flight management system and the cabin integrated avionic system; he flight management system is connected with the on-board composite data chain, issues data information of respective on-board systems connected with the flight management computer and the calculated control data to the ground monitor station by means of the on-board composite data chain; the ground monitor station is connected with the on-station composite data chain, and by means of the on-station composite data chain, uploads data information or control data of the ground monitor station to the flight management system for computation or being distributed to the connected on-board system, so that a method of ground and air manipulation is constructed.

wherein, the flight control system includes a controller, a control mechanism, is connected with a pneumatic control plane of a control object, performs control of respective pneumatic control planes, achieves control of the attitude and the flight path of the aircraft (1); the thrust control system includes a controller, a control mechanism, is connected with an engine accelerator of a control object, controls the thrust of the engine, cooperates with the flight control system to achieve control of the flight path profile and the flight speed of the aircraft; the takeoff and landing control system includes a controller, a control mechanism, is connected with an undercarriage operation device/an airplane wheel brake of a control object, cooperates with the flight control system to achieve control of landing and gliding of the aircraft (1); the flight management system performs combination control on the connected flight control system, the thrust control system and the takeoff and landing control system according to the control level or the control mode.

wherein, the system structure of the movable ground monitor station (2) or the fixed ground monitor station (3) is as follows: it includes an on-station composite data chain, a plurality of monitor seats and a computer display; it further includes an integrated display (23) of the monitoring hall which all the monitor personnel watch, provides navigation computation data, has the function of the option display component CDU, provides a CDU installation interface, corresponding on-station data encoding and decoding, data processing and distribution, air-traffic-control state and meteorological information display, voice communication, an apparatus for giving an alert and an alarm, and working conditions; wherein, the interface of the option display component CDU of the ground monitor station is the same as that of the on-board option display component CDU, the flight plan data is pre-installed in the option display component CDU, and before the flight, on the ground monitor station, the pilot completes read and check on the flight plan.

Specifically, the cooperatively-driven aircraft system of the present invention includes the following parts:

1. General Structure:

the aircraft included in the cooperatively-driven aircraft system has two schemes of driving or controlling the flight on-board. One is a scheme in which the on-board pilot performs the flight, he may select various modes to achieve performing the flight. One of the modes is to select the manual mode and use the telex manipulator to perform the flight. One is a scheme in which the pilot selects the automatic mode or the semi-automatic mode, the flight management system automatically controls the flight.

The cooperatively-driven aircraft system includes a scheme in which the monitor personnel of the ground monitor station perform control of the flight of the aircraft using remote control instructions or data by means of the telemetering remote control and information transmission system and relevant apparatuses on the ground monitor station, it has priority over control of the flight on-board in the control power. Thereby, it can replace the on-board pilot to perform control of the flight of the aircraft, achieve cooperative air and ground driving.

Wherein, the telemetering remote control and information transmission system is a radio link apparatus which constructs connection between the aircraft and the ground monitor station, or called a composite data chain. By means of the composite data chain, telemetering data information of the aircraft may be issued to the ground monitor station, so that the ground monitor station can monitor flight data or control states of the aircraft, and by means of the composite data chain, the ground monitor station may upload the monitor personnel's control data, i.e. remote control instructions or an executable predetermined flight path (containing a go-around flight path), to the flight management system of the aircraft to perform control of the flight of the aircraft. The composite data chain may be divided into two kinds, i.e. a line of sight performance composite data chain and a over-the-horizon performance composite data chain. Generally, a satellite relay communication method is adopted to achieve the over-the-horizon performance.

The above mentioned term 'executable' denotes instruction program or control data which may be executed by a computer. According to the principle of the automatic flight of the aircraft, by calculating data of a navigation apparatus in the navigation monitor system, the flight management system has such performance that it calculates the flight path in deviation of positions expressed by geographic coordinates between a previous way point and the current way point, and performs an automatic flight along that flight path.

2. System Structure:

the aforementioned flight management system is the central system of the on-board system of the aircraft, is mainly formed by a computer and a control apparatus. The flight management computer and relevant units in the flight management system are connected with the on-board system of the aircraft according to classifications, to form a main operation system with mutual input and feedback.

One is to be connected with a navigation monitor system, an engine parameter sensor and an undercarriage/airplane wheel parameter sensor as parameter sensor subsystems, to obtain input of data information of relevant monitoring parameters. One is to be connected with the composite data chain and a cabin integrated avionic system as monitor/manipulation subsystems, so that relevant data information and control data are communicated with each other for being displayed and operated on the aircraft, or are issued to the ground monitor station for use by the ground personnel. One is to be connected with a flight control system, a thrust control system and a takeoff and landing control system as execution subsystems, wherein they output control data, perform control of corresponding control objects.

In the combination control object, the flight control system includes a controller, a control mechanism, is connected with a pneumatic control plane of a control object, performs control of respective pneumatic control planes, achieves control of the attitude and the flight path of the aircraft. The thrust control system includes a controller, a control mechanism, is connected with an engine accelerator of a control object, controls the thrust of the engine, cooperates with the flight control system to achieve control of the flight path profile and the flight speed of the aircraft.

The takeoff and landing control system includes a controller, a control mechanism, is connected with an undercarriage operation device/an airplane wheel brake of a control object, cooperates with the flight control system to achieve control of landing and gliding of the aircraft. The flight management system performs combination control on the connected flight control system, the thrust control system and the takeoff and landing control system according to the control level. The flight management computer in the flight management system and the flight control computer in the flight control system may be separated, or merged, may also be used in combination, to use on-board computer resources reasonably.

The composite data chain connected with the aircraft may be divided into two parts of an on-board composite data chain and an on-station composite data chain, and they are connected together through a radio link. They are connected with the flight management system and the cabin integrated avionic system.

The aforementioned flight management system is connected with the on-board composite data chain, issues data information of respective on-board systems connected with the flight management computer and the calculated control data to the ground monitor station by means of the on-board composite data chain. On the contrary, the ground monitor station is connected with the on-station composite data chain, and by means of the on-station composite data chain, uploads data information or control data of the ground monitor station to the flight management system for computation or being distributed to the connected on-board system, so that a method of ground and air manipulation is constructed.

Wherein, the cabin integrated avionic system receives data information distributed by the flight management system, and at a visible and operable position for the pilot, arranges a display operation apparatus such as the option display component CDU for display or operation, or uses integration of a computer device, a memory and a display apparatus to achieve display or operation of control and data options, or uses a mature control display module CDU, a flight director (for displaying the current position and attitude of the aircraft), as well as other electronic flight instruments (EFIS), of the airplane on active service. When using data, instructions which the telex manipulator needs to display or operate, the option display component CDU may be used. The option display component may be used to display and operate control modes, limited ranges, flight path generation. The CDU is designed to be fixed on-board or mobile, with or without a power source, so that it is installed on-board quickly and connects with the ground monitor station for check.

Wherein, all of a platform structure system which is connected with pneumatic control planes and has the layout support functionality, a power energy system which is connected with the engine accelerator, an electromechanical manipulation system which is connected with the undercarriage operation device/the airplane wheel brake and provides servo energy, are also connected with the flight management system and transmit data information i.e. contained performance data, self-checking data, run and alarm states. Meanwhile, they receive control data of the flight management system and accept control of start, self-checking, conversion, turn off.

A power supply system on the aircraft generally includes a main power source and a storage battery, they form uninterrupted power supply, the lowest voltage thereof is higher than the lowest voltages at which respective on-board system computers restart. The main power source includes one or more generators, stage or many stage generator constitute, may introduce a new energy resource such as solar energy or a fuel cell as the power source.

An observation video system is installed within the cabin of the aircraft, is connected with the flight management system, is used for the pilot's video conversation with the ground monitor station, may be used by the ground monitor station to observe the pilot's working state, and especially when the pilot is in an abnormal state, is used by the monitor personnel to provide control or make an emergence handling scheme.

3. Control Level:

in the flight management system, data chain connection with the ground monitor station is constructed, the control levels are introduced to provide control laws for the flight management system to control its combination control object. By an option display component, three convertible control modes, i.e. manual control, semi-automatic control and automatic control, may be set for the flight management system, so that different driving methods are provided for the pilot. When the manual mode is selected for the flight management system, the flight management system becomes a telex manipulation system, and when the semi-automatic mode and the automatic mode are selected, the flight management system become a task management system.

All of the aforementioned three control modes achieve combination control of the control object by means of the flight management system. One implementation method is: the ground personnel determine a control level for the flight management system, the on-board pilot may select a control mode, so that in accordance with control data given by the pilot and sensor subsystem data information, the flight management system may cooperate to implement and achieve a corresponding control process on the connected combination control object (the flight control system, the thrust control system and the takeoff and landing control system) according to a control law given by the control level and a control function thereof (in order to respond to manipulation instructions of respective control object control modes according to the control law complying with the control level, and achieve the control process according to the predetermined control function).

The use of the telex manipulator is a method of the manual mode, a digital three-axis redundancy telex manipulation system is preferably adopted, a further digitization method may choose a digital full-power system, and retaining a mechanization method may choose to retain mechanical transmission of ailerons. The telex manipulator converts the on-board pilot's manipulation acts into manipulation instructions of electrical signals via a converter to be transmitted to the flight management computer, and in conjunction with control laws of control levels, the flight management computer performs computation to generate a dynamic flight path and distribute and manage it, on way is connected with the execution subsystem, performs combination control on the control object according to the control level complying with the present invention, thereby forming the extended telex manipulation system of the present invention, the other way is connected with the monitor subsystem, transmits the dynamic flight path to a display or the CDU for display, and by means of the composite data chain, transmits it to the ground monitor station for display. The pilot uses the telex manipulator to control the flight, the dynamic flight path which may be generated by it is limited by the flight range and the no-fly range.

The pilot, in the manual mode, manipulates control apparatuses of the accelerator manipulator, the takeoff and landing manipulator and the brake manipulator which form the control object together with the flight management system, calculates respective control instructions generated by manual manipulation through the flight management computer with which they are commonly connected, and switches on/operates pneumatic control planes, or the engine accelerator, or the undercarriage operation device/the airplane wheel brake corresponding to these control objects, respectively. The flight management computer will also perform combination control on the control object herein according to the predetermined control level, so that the flight of the aircraft complies with the specification of the control level.

The on-board pilot selects the automatic control mode, and generated control data of the planned flight path is transmitted to the flight management system, so as to perform automatic control of the flight. The flight management system performs combination control on the connected flight control system, the thrust control system and the takeoff and landing control system according to the control level in accordance with sensor subsystem data information, achieves automatic control of the flight. After the automatic mode is selected, manipulation instructions of the telex manipulator are not received by the flight management system, the flight management computer automatically performs task management on respective control objects, performs automatic control of the flight of the aircraft according to the control level and the predetermined flight path.

When the semi-automatic mode of the flight is selected, the flight management system also implements automatic control of the flight according to a predetermined flight path of one of the predetermined control level and control data. Meanwhile, the pilot is allowed to use the telex manipulator to perform two kinds of adjustment and control within the flight path range set by the flight range, one is that, at the air stage, it is possible to adopt a method of auxiliary anti-collision of deviation adjustment and control, one is that, at the landing stage, it is possible to adopt a method of correction adjustment and control to perform crosswind correction, so as to achieve safe automatic landing in a method which does not depend on the ground monitor station but depend on artificial intelligence intervention. In the semi-automatic mode, the pilot's adjustment and control instructions have priority over the flight management system in the control power.

In the ground gliding, it is possible to adopt the manual mode to perform steering control and braking control of gliding.

With respect to the semi-automatic mode of the ground monitor station, both the air stage and the landing stage apply one method of correction adjustment and control. The characteristic of designing deviation adjustment and control is that the present invention uses performance of RNP1 in a future new navigation system to perform a "flexible flight path" design. Within a flight range of a set flight path, a method of manually manipulating the telex manipulator 11 or a control key may be used to make the aircraft deviate from a predetermined flight path, and after releasing the deviation operation, the aircraft can automatically return to the predetermined flight path to fly, the speed of adjusting the releasing may attain an effect that it returns to the middle position slowly. The allowed amount of deviation is limited by the flight range. When the deviation reaches a limit and is maintained, the deviated flight path will go in the same direction and at the same altitude and at an equal distance, relative to the predetermined flight path. This is mainly applicable to an air stage high density airspace traffic environment, evades other airplanes on the flight path, as well as is advantageous to increase in capacity of the airspace.

The characteristic of design correction adjustment and control is that it is possible to correct a case where the aircraft deviates from the predetermined flight path in the automatic flight by use of a manipulation method of manually manipulating the telex manipulator or a control key, one manipulation generates one correction instruction corresponding to one adjustment quantity of the heading, and according to specific pneumatic characteristics of the aircraft as well as pulse duration time of the instruction, the heading correction amount generated by one correction instruction may be determined. One key-press or a re-manipulation of the telex manipulator after it returns to the middle generates a new correction instruction, the correction amount accumulated for consecutive several times may achieve a large change in the heading, and the correction of the heading may achieve the correction of the flight path deviation. A range of the heading correction amount allowed by the accumulation may be set. It is mainly applicable to correction of deviation of a predetermined flight path caused by a crosswind.

4. Ground Monitor Station:

The ground monitor station and the method of controlling the whole flight process thereof are unique features which form the complete flight control ability of the cooperatively-driven airplane. The following respective details are abbreviated as items, the order description of the items does not denote the order of operation. The aforementioned system structure of the ground monitor station: includes an on-station composite data chain, a plurality of monitor seats and a computer display, especially the function of the big-screen integrated display which all the monitor personnel watch, provides the function of navigation computation data and the option display component, provides an option display component CDU installation interface, as well as corresponding on-station data encoding and decoding, data processing and distribution, air-traffic-control state and meteorological information display, voice communication, an apparatus for giving an alert and an alarm, and working conditions, a necessary power supply and an emergency power supply, lighting and ventilation, apparatuses such as other personnel working environment, etc. The specific product configurations may be combined and modified in the user's detailed design. As a whole, the ground monitor station may be designed to be an in-vehicle mobile structure or a ground-fixed structure.

The aforementioned monitor personnel of the ground monitor station include people at several kinds of speciality posts and have cross-specialty mixing ability, one is a ground control area director or controller, one is a flight director, a flight operator and a link surveillant, one is a flight instructor and a manager. According flight needs, posts of the monitor personnel are distributed at some sites, but are not only limited thereto, one is a present airport control area tower, one is a flight monitor seat of the aircraft, one is a remote airport and ground control area.

The above mentioned ground monitor station includes several functionalities: one is to be responsible for or participate in control and direction of flight activities of the aircraft within a flight airspace and a holding pattern airspace of the airport of the aircraft, mutual adjustment and use of flight airspaces with an adjacent airport and management of an application for an temporary flight airspace, establishment of a cooperative system; one is to be responsible for or participate in definition of spaces of airspaces for training, test flight, low-altitude extreme low-altitude and night flight, etc, of the aircraft in the airport area, coordination of detailed rules and regulations of the airport, management of the on-board pilot, wherein, definition of spaces of flight airspaces with respect to flight features of the aircraft may be in accordance with safety and maximization principles, may set a plane operation area which takes the airport as a center and is multi-quadrant radial and avoids overlap and cross, set upper and lower basically corresponding respective altitude layer plane operation areas according to an altitude layering rule, to facilitate implementation of flight commands; one is that the monitor personnel and the on-board pilot are a team that performs the flight together, they need to follow basic rules of the flight together. The fixed type ground monitor station set at the airport may be called a flight service station.

The aforementioned monitor personnel may use the ground monitor seat's computer display or option display component CDU to generate a flight plan and issue or distribute it to the on-board pilot, and may use the CDU to perform out-of-board preinstallation (corresponding to on-board installation) on multiple pieces of flight plan data of the flights of multiple airplanes at the same time to run a check, check and coordinate the control level, the flight range, the no-fly range, the predetermined flight path and preinstalled various flight path predetermined on respective option display components, as well as other content which must be checked.

The aforementioned the on-board pilot may use the option display component CDU to receive an electronic version of the flight plan, by a wired or wireless network access way, and perform inspection of the flight task (navigation, communication, navigation data). However, wired connection is used for data information of the option display component CDU and the aircraft or the ground monitor station.

The aforementioned pilot installs the option display component on-board, which is connected with the cabin integrated avionic system through the CDU installation interface, supplies power and checks the connection state before the flight, and performs a start-up mutual communication check with the ground monitor station.

In the functional design, the aforementioned ground monitor station may select to be connected with a line of sight or over-the-horizon telemetering remote control and information transmission system, the line of sight telemetering remote control and information transmission system usually adopts an omnidirectional antenna link apparatus, the over-the-horizon telemetering remote control and information transmission system is usually a directional antenna, or adopts a satellite relay communication device, or an ultra-short-wave radio station. Specially, it may adopt a 4G/LTE (containing LTE-A) system, or air/ground relay communication repeater apparatus thereof. The telemetering remote control and information transmission system is briefly called a composite data chain.

In order to be adapted to a case of using multiple aircrafts and multiple ground monitor stations simultaneously, for example, the ground monitor station where the aircraft takes off is given the control power with full content to upload and install various control data on the aircraft, and it may be called a main ground monitor station. Other ground monitor stations which are given partial control power may help the main ground monitor station perform monitoring and emergency control on the flight of the aircraft, they may be called assistance ground monitor stations.

The aforementioned ground monitor station may be divided into functionally independent products, general divided into a takeoff and landing monitor station and a task monitor station. The task monitor station is mainly responsible for monitoring and control of the aircraft at the airport at the landing stage, main apparatuses with which it is configured are monitor seats, navigation, guide, voice communication and a line of sight composite data chain. The task monitor station is mainly responsible for monitoring and control of the flight of the aircraft at the flight stage or landing stage, main apparatuses with which it is configured are apparatuses and monitor seats for navigation, a line of sight or over-the-horizon composite data chain, a voice communication system, an air-traffic-control state and flight path meteorological information system, a ground and air communication radio station, and it may direct, help and replace the takeoff and landing monitor station.

The aforementioned ground monitor station and monitor personnel, at any time, can obtain all issuable data information and may select the content and time of issuing, and at any time, can upload instructions or control data to the flight management system to control it, i.e. the ground monitor station has preferential control power with respect to the on-board system. However, in view of data chain resources being limited, the design scheme may select complete data information to be stored on-board, select only a part of the data information to be issued, and for abnormal or bad data information among the complete data information, a scheme of selective preferentially issuing automatically is adopted, the burden of the on-board composite data chain is reduced, and important data information can be guaranteed to be issued to the ground monitor station correctly and in time.

With respect to control of the aircraft by the ground monitor station, in a normal state, the on-board pilot implements control of the flight. In a special state, according to the control level and task planning, or by analyzing data information issued from the aircraft, the ground monitor station may upload control data to the flight management system to select a control mode so as to implement control of the flight. In an emergency state, the ground monitor station may transmit a homeward voyage instruction, the aircraft will perform a homeward voyage according a shortest flight path or forced landing and landing.

When control data uploaded to the flight management system by the ground monitor station is a control mode, the on-board pilot is allowed to autonomously select the control mode.

When control data uploaded to the flight management system is an automatic mode, the flight management system identifies control data from the ground monitor station, and performs automatic control of the flight of the aircraft according to the uploaded predetermined flight path, and at this time, the on-board pilot does not have the control power to select the manual mode, manipulation instructions of the telex manipulator are not received by the flight management computer.

When control data uploaded to the flight management system is a semi-automatic mode, the flight management system identifies control data from the ground monitor station, and performs control of the flight of the aircraft according to the uploaded dynamic flight path, and at this time, the on-board pilot also does not have the control power to select the manual mode, his manipulation instructions are not received by the flight management computer. However, meanwhile, the ground personnel are allowed to, either at the air stage or at the landing stage, have the preferential control power of the flight management system, can perform deviation remote control or correction remote control on the predetermined flight path uploaded from the ground or generated on-board, achieve, in a special case, a remote control flight of the manual mode of the aircraft performed by the ground monitor station control personnel. The remote control function of the ground monitor station means that control instructions or data information are uploaded to the aircraft by the composite data chain, while a corresponding telemetering function means that the ground monitor station receives data information issued from the aircraft.

5. Integrated Display:

The integrated display (23) (or called a monitoring hall) is a design method and system of the integrated display (23) of the fixed type ground monitor station human machine interface, is applicable to monitoring flights of multiple aircrafts simultaneously, and establishes a technical connection between the flight monitor apparatus and the monitor personnel's demands. A suitable airport is an airport which provides the flight service to the cooperatively-driven airplane in the long term, or an airport which mainly provides the flight service to the cooperatively-driven airplane and also provides the flight service to other airplanes.

In the airport layout, the flight command hall in which the integrated display is installed is responsible for the flight monitoring of the flight airspace and the holding pattern airspace of the present airport, the control tower on a high-rise building which overlooks the airport is responsible for the monitoring of the approach flight path, go-around, the takeoff and landing taxiway and the airport gliding area, real time flight data of the holding pattern airspace and the display are connected within the control tower.

Within the flight command hall, the wide display and the plurality of monitor seats of the integrated display are arranged, working conditions of the monitor personnel such as directors or controllers, flight operators, etc, are provided, there may be a plurality of schemes with different design details.

Two detail design schemes of the integrated display are A and B respectively. The scheme A is a single screen scheme, the multi-quadrant multi-altitude-layer flight operation area of the flight airspace and the holding pattern airspace of the airport are simultaneously displayed in multiple pictures on one display screen, the display method is the same as in the scheme B, and a takeoff and landing area video such as takeoff and landing is displayed on the same screen. The scheme B is a multi-screen scheme, multiple display screens display the multi-quadrant multi-altitude-layer flight operation area respectively, one screen displays the takeoff and landing area video. Wherein, the scheme B of two display screens are preferably adopted. The display screen may be flat or curved.

The multi-quadrant multi-altitude-layer flight operation area is integrally displayed on one wide display. From left to right, each operation quadrant is displayed by one picture respective. From top to bottom, the picture of each quadrantal displays all operation altitude layers. Four quadrant or eight quadrant flight operation area may be arranged in four columns or eight columns, the airspace may be subdivided to increase the number of corresponding quadrants, and may also be arranged in a "k+1" shape. The operation altitude layers of each quadrant are arranged from top to bottom, like drawers. Within each drawer, a moving graph is used to display a flying aircraft, horizontal movement within the drawer denotes the flight of the aircraft in the altitude layer, a click on a certain drawer may unfold a picture covering the quadrant, showing the movement state of the aircraft at the flight path in the altitude layer. And its nearby airspace states may be superimposed, showing current states of the flight path of the aircraft and flight paths of other airplanes. According to the aircraft being located within the flight airspace or within the holding pattern airspace, colors may be used to distinguish and identify respective drawers.

In front of a picture of each operation quadrant, there is a corresponding monitor seat. When the number of the aircrafts which fly simultaneously is large, it is recommended that each monitor seat corresponds to one operation quadrant, in order for the monitor personnel to focus their mind. The monitor personnel may use monitor seat apparatuses to communicate data information or control data with the pilot mutually, implement the monitor of the flight.

The monitoring design scheme in which the wide display and the plurality of monitor seats of the integrated display are adopted are applicable to an unmanned aircraft.

6. Option Display Component:

In order to solve the difficulty of the on-board pilot having no time to temporarily plan the flight path in the flight, it is necessary to plan the flight flight path before the flight. The ground preparation operations before the flight are enhanced, the flight plan or normal or emergency way point flight paths which may be executed therein are preplanned. Before the flight, the option display component CDU is adopted to install the flight plan and perform a running check.

As the option display component CDU of the human machine interaction interface of the flight management system (its first letter 'control' or 'choice' may be replaced, the meaning of 'choice' is intuitive, but the meaning of 'control' is more accurate), several methods are used in the design, one is that the CDU may use integration of a device of the computer function, a memory and a display apparatus to achieve computation, display or operation of options, one is that, in the cabin integrated avionic system or the monitor seat, interchangeable CDU installation interfaces may be customized, one is that the option display component CDU may be designed to be a quick-attach-detach mobile portable electronic apparatus, one is that it may support a wired or wireless network access way, receive an electronic version of the flight plan before the flight, have its own battery and be configured with a charging interface including a USB interface, and generally the wired connection works when data information of the CDU and the aircraft is checked. A mature control display module CDU of the airplane on active service may be selected to be used to improve the design, so as to replace the option display component. In the flight, all of the flight plan data installed by the option display component CDU can not be modified by the on-board personnel.

The design details of the human machine interface of the option display component further include: one is that a form of the display touch screen, or a form of a display screen+ function keys, or a form of a display screen+a keyboard, or combination of these forms may be adapted to the on-board pilot's operation requirements. One is that a page layout in which the display screen may turn pages may be standardized to be adapted to integration of various applications. One is that the option display component provides customized shortcut function keys, such as an emergency homeward voyage function key, provides displaying geographical information data, navigation computation data and real time navigation information and way point information, facilitates operations on the display screen, and it may be configured with APP tools to generate and install flight paths and perform graphics processing, including superimposing subtitles and notes, a picture in picture display function or color effects. By multiple pages and options of the option display component CDU, it is possible to realize application of the flight plan and conversion. The control mode selected on the option display component may be displayed in characters and graphs for confirmation, the generated temporary flight path may be debugged, run and validated, then be automatically connected to the flight management system to perform the flight control, and be issued to the ground monitor station by means of the on-board composite data chain.

In a case where multiple aircrafts fly simultaneously, the wired or wireless network access way of the option display component may be adopted to communicate relevant data of flight plans to each other and correct relevant data of flight plans by each other before the flight, including the flight range, the no-fly range, the predetermined flight path, other backup flight paths and way points, containing homeward voyage and emergency flight paths. Before the flight, the wired connection check is performed at least once.

In the flight, on-board option display component CDUs of multiple cooperatively-driven airplanes may be mutually connected, exchange real time information, may constitute a centerless mobile communication network, and transmit the exchanged information to the flight management system to identify positions and flight information of relevant aircrafts, constitute an actively preventive anti-collision system function by navigation computation.

In an aspect of implementation of functions, the option display component CDU is connected to the flight management system and transmits control instructions or control data to the flight management system, its human machine interface may be used by the on-board pilot to select and operate various control modes, limited ranges and flight path generation. The option display component is connected to the CDU installation interface of the cabin integrated avionic system and is supplied power, and is arranged at a visible and operable position for the on-boar pilot.

When the manual mode is selected on the option display component, the display screen thereof may be used to display the dynamic flight path generated by the pilot manipulating the telex manipulator, and when the semi-automatic mode and the automatic mode are selected on the option display component, the display screen thereof may be used to display and operate the flight path which is within the limited range. The displayed flight path may be superimposed in a geographical information product on the display screen.

On the display screen of the option display component CDU, the top row is generally used to display state conversion, the bottom row is used to display modification and confirmation, multiple middle rows are used to display limited ranges or content of generation of flight paths or are used for operations. The control display component CDU similar to a manned airplane has an advantage that it facilitates the pilot to maintain and communicate the use method.

When the manual mode is selected on the option display component, the display screen thereof may be used to display the dynamic flight path generated by the pilot manipulating the telex manipulator, and when the semi-automatic mode and the automatic mode are selected on the option display component, the display screen thereof may be used to display and operate the flight path which is within the limited range. The displayed flight path may be superimposed in a geographical information product on the display screen.

Instructions and flight paths selected or generated by the human machine interaction interface of the cabin integrated avionic system are inputs for running the flight management system, are also the basis of constituting data interaction and flight control of the aircraft and the ground monitor station, the option display component is an apparatus of the human machine interaction interface. The turning-page operation of the option display component may be used, and for example, if it is a touch screen, the operation may be made on the screen. Pages are turned to check relevant flight data of the flight plan (flight paths which may be invoked), and in the flight, all the flight plan data installed by the option display component may not be modified by the on-board personnel.

The predetermined flight paths and flight paths which may be invoked, containing the emergency flight path, the go-around flight path, the flight range, the no-fly range, as well as the temporary flight path generated on-board, all may be displayed on the option display component, may select mutual perspective superimposition to perform a comparison or check, select to match the geographical information product, and may display the generated temporary flight paths and way points on the screen.

The control mode selected on the option display component may be displayed in characters and graphs for confirmation, the generated temporary flight path may be debugged, run and validated, then be automatically connected to the flight management system to perform the flight control, and be issued to the ground monitor station by means of the on-board composite data chain.

In the flight, the option display component satisfies the on-board pilot's various flight operations:

Set way points: display or set a flight path start point, a current way point, a previous way point, a next way point.

Set flight path instructions: a reflight, a supplementary flight, a sightseeing flight path, a homeward voyage instruction, or use a flight path instruction to automatically generate one flight path in a shortcut way.

Wherein: selecting the reflight denotes flying again from entering the flight path start point at the air stage. Therefore, the pilot may confirm the flight path start point on the option display component, or input a reflight instruction, and the aircraft will automatically fly from the current way point to the flight path start point and then perform the reflight.

Selecting the supplementary flight denotes returning from the current way point to the previous way point and flying again. Therefore, the pilot may confirm the previous way point on the option display component, or input a supplementary flight instruction, and the aircraft will automatically fly from the current way point to the previous way point and then perform the supplementary flight.

On the option display component, a sightseeing flight path and the next way point are planned, or a sightseeing flight path instruction is inputted, the airplane can fly from the current way point to a sightseeing flight path which uses the next way point as a start point, implement the sightseeing flight path flight. The entire air stage may be used as a sightseeing flight path, and selection of the sightseeing flight path has the same effect as that of selection of the reflight.

According to the pilot's selection or with respect to an emergency, it is possible to select a homeward voyage instruction or a homeward voyage flight path on the option display component, to input a next way point which the homeward voyage flight path will pass, or to select an emergency flight path, all of which can end the predetermined flight path or the dynamic flight path and perform the homeward voyage ahead of time.

7. Navigation Monitor System:

The flight management system includes a navigation monitor system, the navigation monitor system is connected with the flight management system, the on-board composite data chain and the cabin integrated avionic system connection, data information thereof is transmitted, by the flight management system, to the cabin integrated avionic system to be displayed and applied, or transmitted, via the on-board composite data chain, to the ground control area or the ground monitor station to be displayed, applied or recorded. According to laws, at a predetermined air stage, transmission of the data information to the ground may be stopped. The navigation monitor system have openness, can be improved in synchronization with requirements of a future air navigation system (FANS) of ICAO. The navigation monitor system integrates multiple subsystems, including a navigation system, an automatic dependent surveillance-broadcast ADS-B and air-traffic-control responding system, a voice communication system, a ground and air communication radio system, a ground landing guide on-board system. Wherein:

The navigation system provides navigation computation data for the flight management system, integrating satellite and inertia combination navigation, satellite difference navigation, radio navigation of the composite data chain, an atmosphere data computer system, an attitude sensor, astronomy navigation, ground landing guidance, and may be modified in the user's detailed design. The navigation system is connected with the flight management system and provides four-dimensional position data and relevant information, provides basic navigation data for navigation computation data of the flight management system, performs the flight control of the flight path, so that control data is identified and provided in geographical positions. Given the navigation performance RNP and precision which the present aircraft can achieve, the flight path flight control is superior to RNP0.3, the flight path flight control satisfies RNP1 (RNAV), thus the deviation adjustment and control method proposed by the present invention may be used, and RNP also satisfies CATIIIC close approach, satisfies terminal precision RNP, is suitable for RNP AR, it is possible to choose the landing ability of RNP AR APCH.

The automatic dependent surveillance-broadcast ADS-B or air-traffic-control responding system is connected with the flight management system. On the one hand, the automatic dependent surveillance-broadcast ADS-B or air-traffic-control responding system transmits real time data information to the cabin integrated avionic system, the data information may be displayed, give an alarm, or be recorded. Meanwhile, by means of its own data chain, the real time data information is directly transmitted to the ground control area to be monitored and managed and controlled by the ground controller. Or, by means of line of sight or over-the-horizon link encoding of the on-board composite data chain, the real time data information is transmitted to the ground monitor station, and received navigation states of other airplanes around the present aircraft are displayed. On the one hand, data information of the automatic dependent surveillance-broadcast ADS-B or air-traffic-control responding system is used to obtain dangerous states in which other airplanes nearby approach the present airplane, the flight management system calculates an air anti-collision strategy of the aircraft and an evasion flight path, establishes the control ability of air anti-collision of the present airplane, forms control laws of air automatic anti-collision of the present airplane, wherein, a precision superior to the RNP1 type is adopted, it is possible to reduce the altitude layer interval and the horizontal interval required by air anti-collision, which is advantageous to increase the flight density and use airspaces dynamically and reasonably. In an application, the data chain of the automatic dependent surveillance-broadcast ADS-B should adopt UAT or 1090ES, which may be determined according to suggestions and requirements of the civil aviation department. And one or both of the automatic dependent surveillance-broadcast ADS-B and air-traffic-control responding systems are adopted, this may also be selected according to local air-traffic-control conditions.

The voice communication system communicates with a ground control area voice radio by an on-board voice radio through voice encoding via the line of sight or over-the-horizon link of the composite data chain, accordingly, the line of sight or over-the-horizon link of the on-station composite data chain performs voice encoding correspondingly, so that the ground monitor station can perform voice communication with the ground control area or the ground monitor station along the way, with the flight of the aircraft. The frequency of the voice radio should comply with requirements by the civil aviation department.

The on-board ground and air communication radio system communicates with the ground independently. The light of the ground and air communication radio system or navigation indicates that the system may be connected with the flight management system. According to laws, it may be shut down automatically at the air stage, and only turned on at the takeoff and landing stages.

A ground landing guide system built at the airport may work as a landing backup system of the aircraft, improving security. This kind of technological product is relatively mature, the present invention recommends that the aircraft being configured with the corresponding on-board system.

8. Flight Range (of Flight Path and of Airspace):

The flight range is executable control data, geographic coordinates are used to identify an airspace range in which the aircraft is allowed to fly, and prevent the aircraft from flying beyond that range. By data information of the navigation monitor system, the flight management system can identify and limit the flight range in the flight. The flight range includes a flight path range and a task airspace range, the flight path range is a certain width or height range set with respect to the flight path, numerical values may be relatively fixed, and may be denoted by relative coordinates with geographic coordinates of the flight path being used as a reference, may be used as a safety interval for planning the flight path, may be used as adjustment and controllor remote control on the flight path. The airspace range is limitation on width or height ranges including task airspaces denoted by geographic coordinates in the flight, is usually set with respect to each flight, may also be set and relatively fixed with respect to training around the airport, regular field operations or a traffic flight path flight airspace.

The ground personnel install the flight range to the flight management system. Generally, it is uploaded and installed to the flight management system by the ground monitor station, or installed, by using the CDU, together with the flight plan, and may be displayed on the ground monitor station and the cabin integrated avionic system.

The flight range can not be modified by the on-board personnel, generally can not be modified in the flight.

The flight range has priority over the on-board pilot driving in the manual mode or planning the flight path range in the automatic mode in the control power. When the on-board pilot selects the automatic mode to use the option display component to generate or install a flight path, according to identification of the flight range, the option display component will automatically remind the pilot and refuse to generate flight paths which do not comply with the flight range. But, it may automatically generate and optimize an evasion flight path which complies with the flight range.

When the pilot selects the manual mode to manipulate the telex manipulator to fly and generate a dynamic flight path, before the aircraft approaches or arrives at the flight range, the flight management system automatically prompts an alarm or automatically interrupts the pilot's dynamic flight path, and automatically changes the original flight path to return within the flight range, automatically flies standby on the spot, waits for the pilot to, within the flight range, continue the manual mode or select other control modes to manipulate the flight of the remaining flight path. When it exceeds a predetermined standby time, the aircraft will automatically switch to a new flight path to fly, within the flight range, according to a predetermined handling scheme or task plan, including automatically performing homeward voyage and landing.

The no-fly range is also one of control data which may be installed on the aircraft, is an airspace range indicated by geographic coordinates, in which the aircraft is prevented from flying. By data information of the navigation monitor system, the flight management system can also, in flight, identify and prevent from entering the no-fly range. The no-fly range includes the air forbidden zone, the limited area and the dangerous zone, etc, within the flight range, as well as a building which threatens air safety, a mountain land and a forest zone and a bad weather area. The no-fly range is usually set with respect to each flight, may also be set and relatively fixed with respect to training around the airport, regular field operations or a traffic flight path flight airspace.

The ground personnel install the no-fly range to the flight management system according to data issued by the government. Generally, it is uploaded and installed to the flight management system by the ground monitor station, or installed, by using the CDU, together with the flight plan, and may be displayed on the ground monitor station and the cabin integrated avionic system. The no-fly range can not be modified in the flight.

The no-fly range has priority over the on-board manual mode, the semi-automatic mode and the automatic mode in the control power. If a plan of entering the no-fly range appears when the predetermined flight path is performed, it will be prompted and refused by the system. But, the flight management system may automatically optimize and generate an evasion flight path which complies with the flight range and the no-fly range.

A case of performing the flight is the same as the flight range.

When the pilot selects the manual mode to manipulate the telex manipulator to fly and generate a dynamic flight path, before the aircraft approaches or arrives at the no-fly range, the flight management system automatically prompts an alarm or automatically interrupts the pilot's dynamic flight path, and automatically changes the original flight path to evade the no-fly range, automatically flies standby on the spot, waits for the pilot to, within the flight range, continue the manual mode or select other control modes to manipulate the flight of the remaining airline flight path. When it exceeds a predetermined standby time, the aircraft will automatically evade the no-fly range and automatically switch to a new flight path to fly, within the flight range, according to a predetermined handling scheme or task plan, including automatically performing homeward voyage and landing.

9. Emergence Handling:

When an abnormal condition in which there is a prompt or an alarm, occurs in the aircraft, preferentially the on-board pilot and the ground monitor station monitor personnel cooperate with each other by means of the composite data chain. Before/in the flight of performing the emergency flight path and homeward voyage and landing, this should be approved by the ground control area and the airport controller.

When there is abnormality in the aircraft, the cabin integrated avionic system gives a prompt or an alarm, the flight control system automatically switches to an emergency state, and flies standby for a predetermine time. If neither of the on-board personnel nor the ground personnel has a manipulation response, the aircraft automatically switches to a homeward voyage flight path or an emergency flight path to automatically perform homeward voyage and landing according to a preinstalled emergency handling scheme.

One special case is that, (system failures and the pilot's illness, flight path abnormality, unknown reasons) when the aircraft is in an emergency state, the flight management system automatically switches to a flying standby state, waits for a predetermine time, and automatically issues prompt or alarm data information.

With respect to the above case, at this time, the ground monitor station personnel may, according to telemetering data information issued by the aircraft, switch to an image of an on-board observation video system, determine attributes of data information, may decide handling measures to be taken on the aircraft, including uploading control data voice, sending a prompt or an alarm to the on-board pilot, prompting handling measures to be taken, including evading collision, focusing on weakening of navigation or measure and control link signals, the flight range or a bad weather alarm, as well as system failures, etc. If there is no fatal failure on-board, the on-board pilot preferentially handles it.

If the on-board pilot has an abnormal state, the ground monitor station personnel may select handling measures, including sending a homeward voyage instruction in an emergency case. Especially, the aircraft deviates from the predetermined flight path abnormally, and the on-board pilot does not correct this after a predetermine waiting time, or the image of the on-board observation video system shows that the airplane is abnormal, the ground monitor station may, in an emergency case, upload a homeward voyage instruction or an emergency flight path, stop the on-board manual mode, guide the aircraft to perform homeward voyage and landing.

If no handling measures are taken on-board for unknown reasons when it exceeds a predetermine waiting time, the ground monitor station personnel may preventively instruct the aircraft to automatically perform homeward voyage and landing.

After the on-board pilot does not take reasonable measures in a predetermine time, the ground monitor station will force the aircraft to control the flight in the automatic mode, or according to an emergency case, upload control data to control the aircraft to automatically switch to the homeward voyage flight path, i.e. switch from the current way point to the approach flight path entrance, and perform homeward voyage landing.

For the on-board pilot, a special case is that, when the aircraft prompts or warns an emergency state, the ground monitor station has no manipulation response (containing ground abnormality), the on-board pilot may select the homeward voyage airline flight path to implement automatic homeward voyage (containing the departure airport). At the air stage, the pilot may adopt a deviation adjustment and control auxiliary anti-collision method, and at the landing stage, he may adopt a correction adjustment and control method, so that he achieves safe automatic landing in a method which does not depend on the ground monitor station but depends on the on-board pilot's artificial intelligence intervention. At this time, the on-board pilot may also select the emergency flight path to perform automatic homeward voyage, use the emergency homeward voyage function key on the option display component to complete the homeward voyage option quickly, achieve the aircraft performing automatic homeward voyage from the current way point in the shortest path and landing, or perform emergence handling of performing forced landing and landing at a near airport.

At the air stage, when a case where there is normal encounter (basic rules of the flight) in the air occurs, the pilot may use deviation adjustment and control of the semi-automatic mode to perform manual manipulation, adjust and control the evasion effect in cooperation with the evasion flight path of automatic evasion provided by the semi-automatic mode. At the landing stage, the on-board pilot may select the semi-automatic mode, perform correction adjustment and control of the gliding flight path according to the airport director's instructions, and may manually use the braking function of the takeoff and landing system to be adapted to variations of the airport gliding flight path.

After the on-board pilot uses a mode selector to make his selection, mode confirmation may be used, and a prompt of a mode being not selected or being not confirmed may be given, and generally, an acousto-optic prompt way is adopted.

Normal landing of the aircraft may apply the RNP AR flight path. When the on-board pilot selects the emergency flight path at the air stage, the flight management system automatically obtains the approach flight path or terminal precision RNP (window flight path entrance) associated with the airport, and connects to the approach flight path entrance or the entrance way point designated by the ground control area, from the current way point. If the emergency flight path has special needs, the pilot may use a flight path generation computer to select the emergency approach flight path of the homeward voyage airport, the flight management system will accordingly switch the next way point to the emergency approach flight path entrance automatically.

If the emergency flight path encounters a no-fly range, according to preinstalled control data of no-fly ranges, the flight management system adopts an automatic evasion flight path to circumvent that airspace.

If there is encounter in the air on the emergency flight path, the flight management system and the navigation monitor system automatically perform the evasion flight path according to basic rules of the flight, the on-board pilot may adopt a deviation adjustment and control/correction adjustment and control method to assist in the evasion flight.

10. Control Range:

The control range is executable control data, is a space region indicated by geographic coordinates. The flight management system performs antenna directing on the composite data chain, or switches on and switches off the control, designates the connected ground data link, selectively limits it selecting the mutually connected ground monitor station. Both directional or omnidirectional antenna links should comply with selective requirements, the goal is to increase the number of the aircrafts which the ground monitor station may simultaneously monitor. The monitor personnel install the control range to the flight management system, and it may be displayed on the cabin integrated avionic system.

The control range may be expressed by a space curved surface. Adjacent curved surfaces are complementary and staggered, they constitute closed curved surface spaces on a plane. It may be specified that, within a control range, the on-station composite data chain of the ground monitor station can be communicated with the on-board composite data chain of an aircraft within the same control range, but can not be communicated with the on-board composite data chain of an aircraft outside that control range and on the boundaries thereof. The boundaries of control ranges may be separate, contiguous, but should avoid crossing. When an emergency standby occurs, the on-board personnel are allowed to modify control ranges.

By means of a directional antenna link, an omnidirectional antenna link, or a mobile communication 4G/LTE (containing LTE-A) link, or a digit multibeam phased array antenna link, as well as a multi-antenna link combined by said antenna links, and in cooperation with spectrum sensing and access and an electronic identity number of the aircraft, the on-station composite data chain of the ground monitor station enables the ground monitor station to perform telemetering, remote control, information transmission on one or more aircrafts within the control range, or perform positioning and tracking on these aircrafts, achieves communication of data information between the ground monitor station and the aircraft within the control range, and may operate the aircraft by transmitting control data.

When the ground monitor station, by means of the omnidirectional antenna link, identifies that the aircraft within the control range needs directional measurement and control, the multi-antenna link combination can allocate or automatically allocate antenna beams to perform directional measurement and control and broad band information transmission on these aircrafts, solve the need of real time transmission to the ground monitor station of the observation video system and other broad band videos on individual aircraft, or the need of adopting point to point measurement and control for emergency measurement and control. In the user's detailed design scheme, with respect to a configuration case where the number of the aircrafts which fly simultaneously is relatively large and the number of the seats simultaneously displayed on the ground monitor station is limited, preferably, the composite data chain adopts a technical solution of cyclic polling with respect to the aircraft, selectively issues data information to be downloaded, i.e. briefly and emphatically issues prompt alarm data information, reduces occupation of bandwidth.

Another design method of selective data transmission is that, all issuable on-board data information is preferentially stored, it is not necessary to issue all the data information to the ground monitor station in real time, and only when there is abnormality or malfunction, the data information is selectively issued, and data information associated with the prompt or alarm period is issued to the ground monitor station, to reduce the burden of the data chain.

11. Multiple Stations Multiple Aircrafts, Constituting a Kind of Interoperability:

The control range may extend the use, i.e. by setting the control range and setting mutual communication between the aircraft and the ground monitor station of its control range, i.e. a mutual communication and interoperation relation is constructed between the control range and the aircraft, and by mutual communication of the control range, the "multi-leap" transmission relation with the ground monitor station is constructed, over-the-horizon networking measurement and control and communication of the aircraft is achieved.

When the aircraft flies from a control range into an adjacent control range, after the on-board composite data chain of the aircraft exits the boundaries of the original control range, the composite data chain starts to establish a measurement and control connection with a ground monitor station within the new control range, or called selective mutual communication, the previous ground monitor station interrupts mutual communication with the aircraft.

When the aircraft flight space extends beyond the control range and does not extend into the new control range, as long as the antenna of the composite data chain has controllable level strength with respect to the aircraft, it is still possible to continue measuring and controlling the aircraft until the aircraft enters other already set control range, and a ground monitor station within the new control range airspace performs measurement and control connection with the aircraft.

If the aircraft flies within an airspace with no control range being set and no new ground monitor station connects and measures and controls after a set delay time, the ground monitor station may re-determine the delay time, or extend the control range into the flight airspace of the aircraft, the aircraft still receives measurement and control from the ground monitor station of the previous control range, or performs a process according to a predetermined emergency scheme, including the aircraft automatically performing homeward voyage.

If the set contiguous control ranges cross accidentally, within the crossed airspace, a control range which has been already measured and controlled (a control range which is controlled earlier) has priority in maintaining measurement and control.

A ground communication optical fiber or radio communication network connection may be built between a plurality of ground monitor stations to communicate data information to each other, the connected data information includes the electronic identity number of the aircraft, the local ground monitor station may broadcast or fix-point forward the measurement and control data information issued by the flying aircraft to the present airplane station or website, and may coordinate the setting of control ranges through the Internet.

By setting the control range, priorities with respect to measurement and control of the aircraft and relay leaps of measurement and control between ground monitor stations of adjacent control ranges may be established, thereby forming a method of mutual communication and interoperation. Such a method of applying control ranges in combination between the aircraft and the ground monitor stations determines establishment of a mutual communication and interoperation relation between multiple ground monitor stations with the same performance and one or more aircrafts, it is possible to construct an application of a "multi-leap" over-the-horizon data chain at a plurality of ground monitor stations at a long distance, such a design method is advantageous to the use of frequency resources of the composite data chain, and is advantageous to adopt a standardized information format, establish an open type format and interface system, is configured with a general ground monitor station, improve the economy.

The control range may be used to control the switch on and switch off of the on-board composite data chain, is applicable to selective automatic switch on of the backup data chain or safe measures of radio quiescence anti-interference. It may also be used to selectively issue on-board data or captured picture data.

In a method of driving by oneself, the pilot of the cooperatively-driven aircraft can achieve a think-and-fly flight through the manual mode, is a typical method of the flight of the manned aerial vehicle. It is also possible to use a keyboard or a touch screen to generate a flight path on-board, and automatically install it to the control system of the cooperatively-driven airplane to automatically implement the flight control. The latter is a typical flight control method of an unmanned aerial vehicle system. Likewise, the ground monitor station can also generate a flight path, install it to the cooperatively-driven airplane system to implement the flight control, and when malfunctions occur in the aircraft, take over the control of the flight, significantly improve the security of the flight of the aircraft. Meanwhile, a part of the monitor personnel at the ground monitor station are developers of the aircraft system, and are also experts in flight management and flight control, but are not professional pilots. This is an essential huge change. This will facilitate large-scale professionalized development of aviation flight management and ground flight guarantee, but facilitate non-professionalization of the pilot team. The cooperatively-driven aircraft will accompany ordinary people who drive by himself, and go to a new century of non-professionalizd aviation.

The cooperatively-driven aircraft of the present invention inherits a mature flight anti-collision technology, focuses on improvement of application depth of the anti-collision technology, can effectively use air-traffic-control resources, can be improved in synchronization with requirements of a future air navigation system (FANS) of ICAO, guarantee the safety of the flight of the flight path and the airspace. As an emerging aerial technology and an aviation industry, the cooperatively-driven aircraft will rapidly enter a wide application field, become an upgraded and updated technology and product of the general aviation, will share airspace resources together with a business transportation airplane and a traditional general aviation airplane. As needs and development of the new technology aviation industry, the cooperatively-driven aircraft has great potential, it will surely accelerate and implement achieve contribution to national economic construction by the aviation industry, especially the general aviation industry, and it is a new direction and a new hope of development of the Chinese general aviation industry.

DRAWINGS

EXPLANATION OF REFERENCE NUMERALS

1—aircraft, 2—movable ground monitor station, 3—fixed ground monitor station, 4—data link, 5—relay communication device, 6—fuselage, 7—wing, 8—aileron, 9—spoiler, 10—flap, 11—air brake, 12—horizontal rudder, 13—horizontal tail, 14—vertical tail, 15—vertical rudder, 16—aileron operating lever, 17—rudder stock converter, 18—aileron control mechanism and lever system, 19—conversion bolt, 20—aileron, 21—slide guide, 22—platform fixation base, 23—integrated display.

DETAILED DESCRIPTION

Hereinafter, the present invention is further explained in detail in conjunction with the drawings and embodiments.

Figure 1:
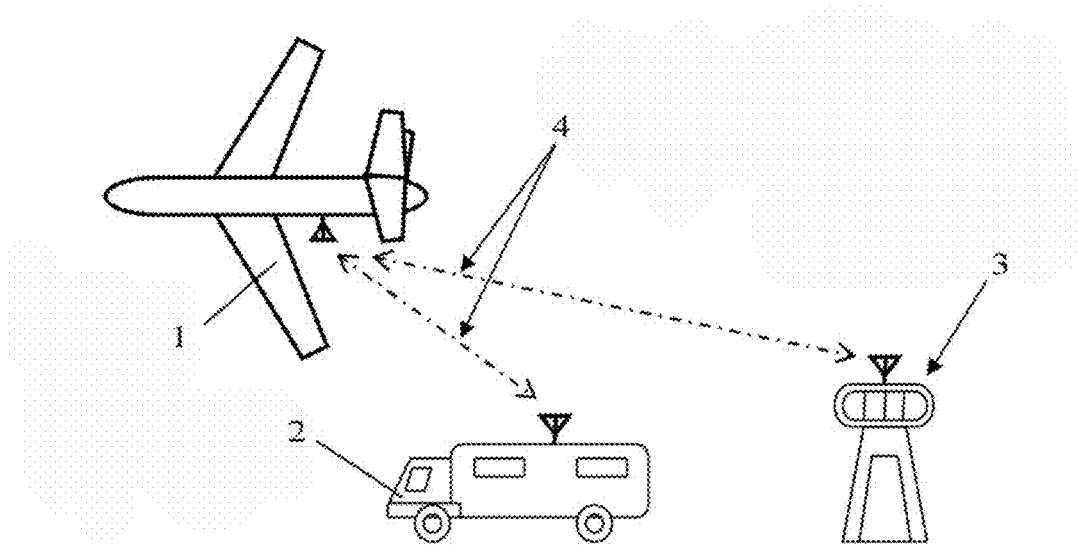
FIG. 1 is a schematic view of a line of sight link of a cooperatively-driven aircraft system.
Figure 2:
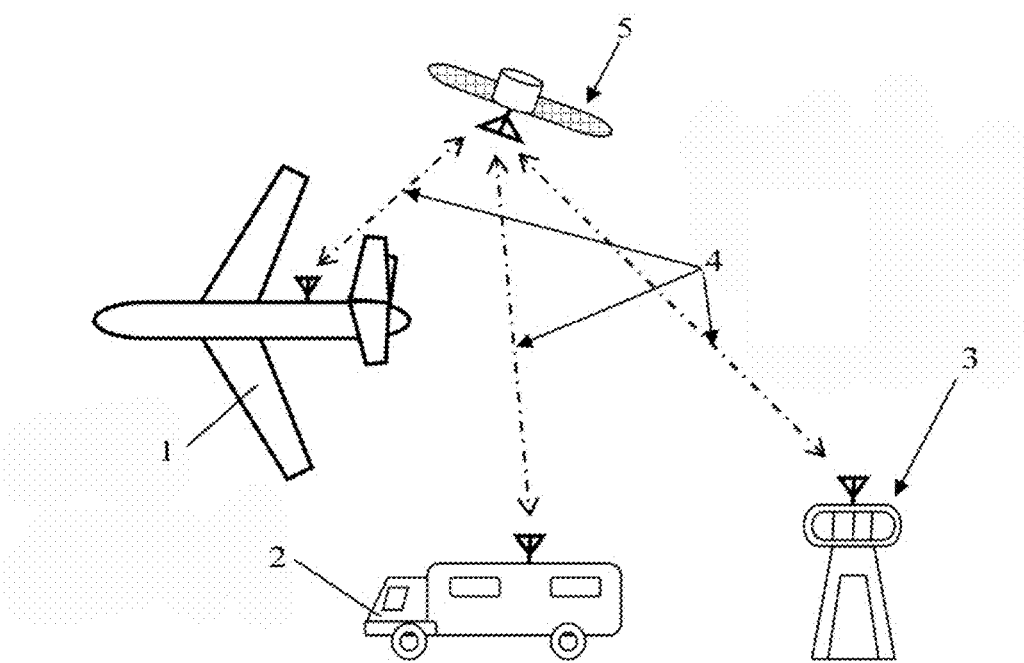
FIG. 2 is a schematic view of an over-the-horizon link of a cooperatively-driven aircraft system.

The monitor personnel of a ground monitor station (including a movable ground monitor station 2 and a fixed ground monitor station 3) included in a cooperatively-driven aircraft system of the present invention, by means of a data link 4 of a composite data chain and relevant devices on the ground monitor station, performs a flight control scheme of an aircraft 1. The composite data chain may be divided into two kinds, i.e. a line of sight performance composite data chain and a over-the-horizon performance composite data chain. Generally, a relay communication device 5 such as a satellite is adopted to achieve the over-the-horizon performance. As shown in FIGS. 1 and 2, FIG. 1 is a schematic view of a line of sight link of a cooperatively-driven aircraft system, FIG. 2 is a schematic view of an over-the-horizon link of a cooperatively-driven aircraft system.

Figure 3:
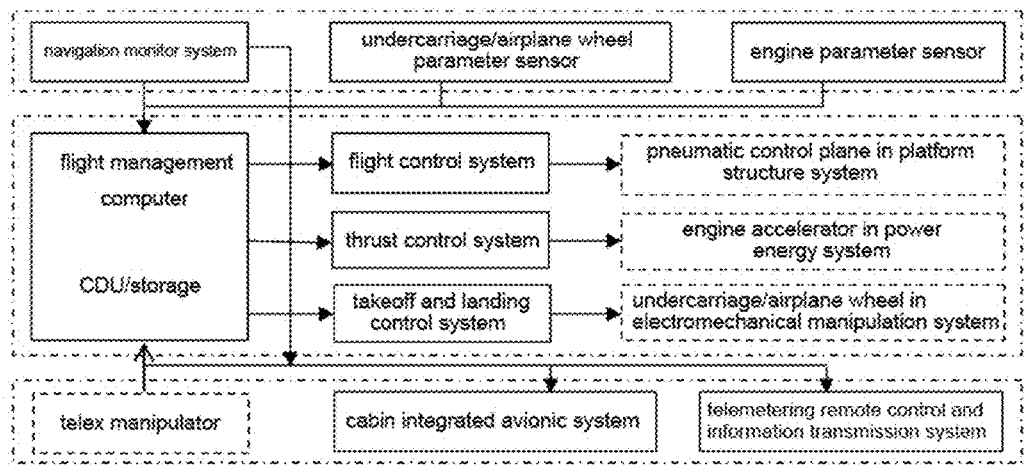
FIG. 3 is a schematic view of a flight management system of a cooperatively-driven aircraft.

Its overall structure is: a cooperatively-driven aircraft system includes an aircraft 1, a ground monitor station (including a movable ground monitor station 2 and a fixed ground monitor station 3) and a composite data chain. Wherein, a pilot and a main on-board system i.e. a flight management system (the structure of the flight management system is as shown in FIG. 3), are inside the aircraft 1. The pilot may use a telex manipulation system to perform the flight, whereas the flight management system performs automatic control of the flight in a flight task management way. Meanwhile, the aircraft 1 is connected to the ground monitor station by means of a radio data link 4 of a composite data chain, telemetering data information about the flight management system may be issued to the ground monitor station by means of the composite data chain, so that the ground monitor station can monitor the flight data or state of the aircraft 1, and by means of the composite data chain, the ground monitor station may also upload its own control data (i.e. control instructions, or the control data is called an executable predetermined flight path) to the flight management system of the aircraft 1 to perform control of the flight of the aircraft 1, thereby it can perform control of the flight of the aircraft 1 instead of the pilot on the aircraft 1, achieve cooperative air and ground driving.

As shown in FIG. 3, on the aircraft 1, a flight management computer and relevant units of a flight management system: are connected with a navigation monitor system, an engine parameter sensor and an undercarriage/airplane wheel parameter sensor as parameter sensor subsystems, to obtain data information of relevant self-checking parameters as an input; are connected with the composite data chain and a cabin integrated avionic system as monitor/manipulation subsystems, so that relevant data information and control data are communicated with each other for being displayed and operated on the aircraft 1, or are issued to the ground monitor station for use by the monitor personnel; are connected with a flight control system, a thrust control system and a takeoff and landing control system as execution subsystems into a combination control object, wherein they output control data, have respective servo control mechanisms to perform control of corresponding control loads, the above connections constitute a main operation system of the flight management system. By an option display component, three convertible control modes, i.e. manual control, semi-automatic control and automatic control, are set for the flight management system, so that different driving methods are provided for the pilot. When the manual mode is selected for the flight management system, the flight management system becomes a telex manipulation system. The telex manipulator converts the on-board pilot's manipulation acts into manipulation instructions of electrical signals via a converter to be transmitted to the flight management computer, achieves control of the flight control system in conjunction with control laws of control levels. When the semi-automatic mode and the automatic mode are selected, the flight management system becomes a task management system.

As shown in FIG. 3, in the combination control object, the flight control system includes a controller and a control mechanism, is connected with a pneumatic control plane of a control load, performs control of respective pneumatic control planes of three axes of pitch, roll and yaw, achieves control of the attitude and the flight path of the aircraft. The thrust control system includes a controller and a control mechanism, is connected with an engine accelerator of a control load, controls the thrust of the engine, cooperates with the flight control system to achieve control of the flight path profile and the flight speed of the aircraft. The takeoff and landing control system includes a controller and a control mechanism, is connected with an undercarriage operation device/an airplane wheel brake of a control load, cooperates with the flight control system to achieve control of landing and gliding of the aircraft. The flight management system performs combination control on the connected flight control system, the thrust control system and the takeoff and landing control system according to the control level. Both the flight management computer and the flight control system have redundancy, may be made of devices having computation functionality and designed together.

Figure 4:
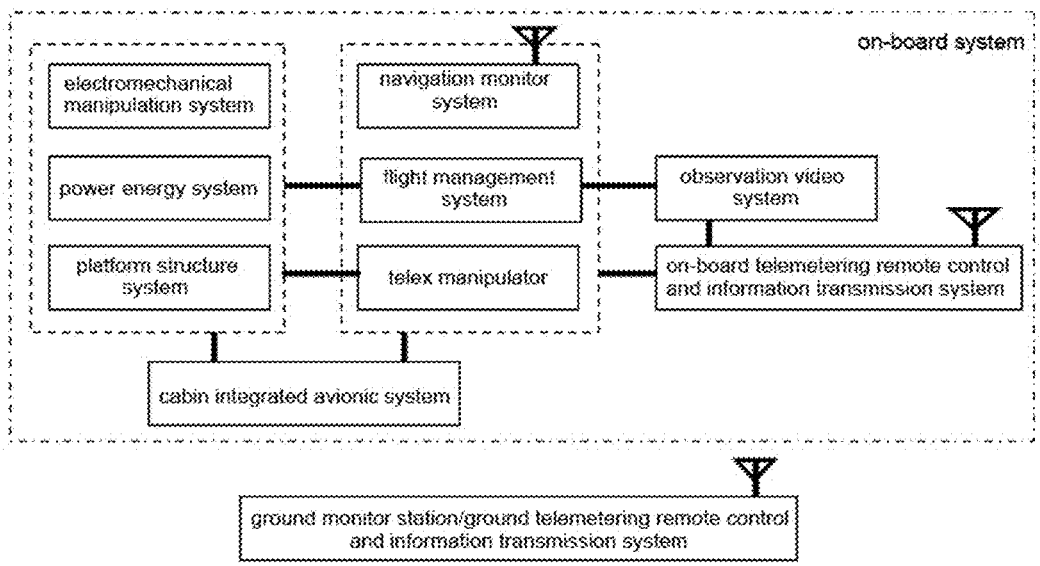
FIG. 4 is a schematic view of an on-board system of a cooperatively-driven aircraft.

As shown in FIGS. 3 and 4, the composite data chain connected with the aircraft 1 is divided into two parts of an on-board composite data chain and an on-station composite data chain, and they are connected through a radio link. The flight management system is connected with the on-board composite data chain, issues data information of respective on-board systems connected with the flight management computer to the ground monitor station by means of the on-board composite data chain. The ground monitor station is connected with the on-station composite data chain, and by means of the on-station composite data chain, uploads data information or control data of the ground monitor station to the flight management system for computation or being distributed to the connected on-board system, so that a method of ground and air cooperative manipulation is constructed.

As shown in FIG. 4, wherein, the cabin integrated avionic system receives data information distributed by the flight management system, and at a visible and operable position for the pilot, arranges a display operation apparatus such as the option display component CDU for display or operation, or uses integration of a computer device, a memory and a display apparatus to achieve display or operation of options, or uses a mature control display module CDU, a flight director (for displaying the current position and attitude of the aircraft 1), as well as other electronic flight instruments, of the airplane on active service. When using data, instructions which the telex manipulator needs to display or operate, the option display component CDU (of its human machine interaction interface) may be used.

Figure 5:
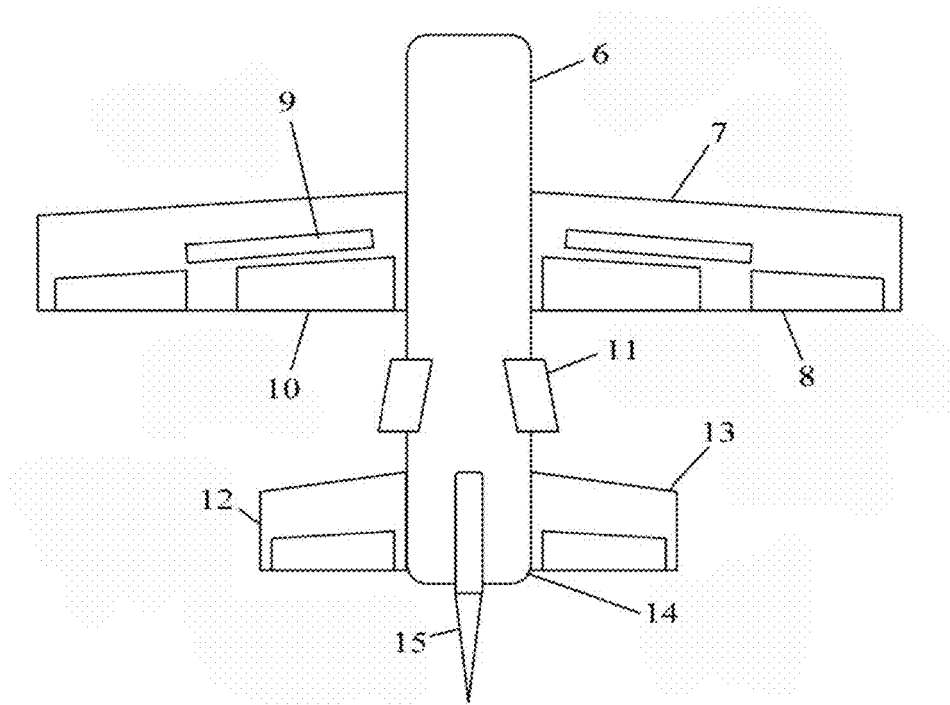
FIG. 5 is a schematic view of components of a pneumatic control plane.

Wherein, all of a platform structure system which is connected with pneumatic control planes and has the layout support functionality, a power energy system which is connected with the engine accelerator, an electromechanical manipulation system which is connected with the undercarriage operation device/the airplane wheel brake and provides servo energy, are also connected with the flight management computer system and transmit data information (i.e. contained performance data, self-checking data, run and alarm states). Meanwhile, they receive control data of the flight management computer system and accept control of start, self-checking, conversion, turn off. As shown in FIGS. 3, 4 and 5. In FIG. 5, the structure of the pneumatic control plane includes components such as a fuselage 6, a wing 7, an aileron 8, a spoiler 9, a flap 10, an air brake 11, a horizontal rudder 12, a horizontal tail 13, a vertical tail 14 and a vertical rudder 15.

A power supply system on the aircraft 1 generally includes a main power source and a storage battery, they form uninterrupted power supply, the lowest voltage thereof is higher than the lowest voltages at which respective on-board system computers restart. An observation video system is installed, is connected with the flight management system, is used for the pilot's video conversation with the ground monitor station, may be used by the ground monitor station to observe the pilot's working state.

Control levels and the combination control load: in the flight management system, data chain connection with the ground monitor station is constructed, the control levels are introduced to provide control laws for the flight management system to control its combination control object. Three convertible control modes, i.e. manual control semi-automatic control and automatic control, are set. When the manual mode is selected for the flight management system, the flight management system becomes a telex manipulation system, and when the semi-automatic mode and the automatic mode are selected, the flight management system becomes a task management system. See FIG. 6.

Figure 6:
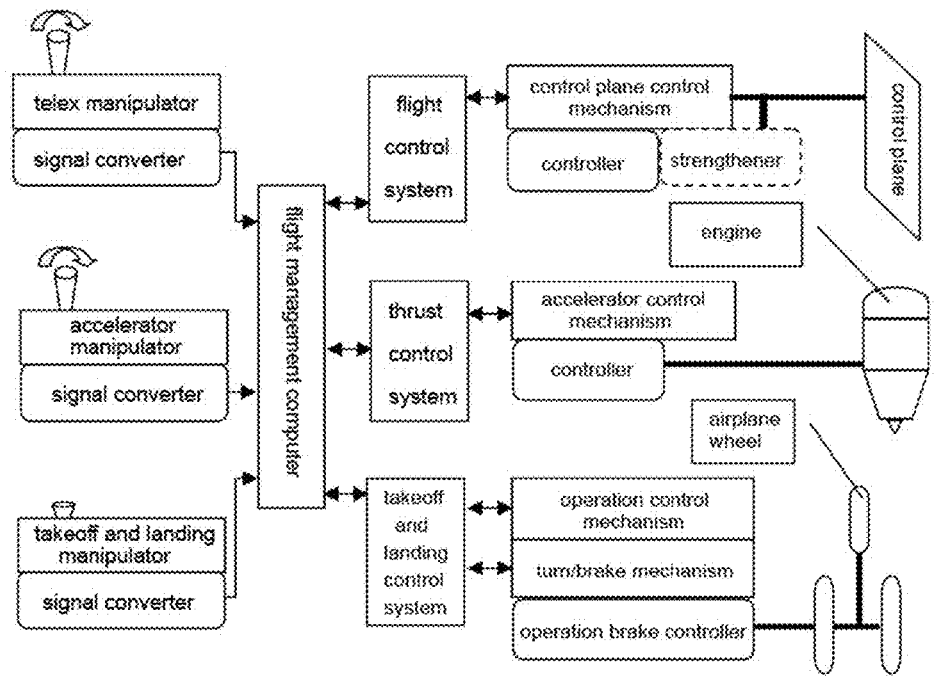
FIG. 6 is a schematic view of a typical transfer relation of a combination control load.

As shown in FIG. 6, all of the three control modes achieve combination control of the control load by means of the flight management system. One implementation method is: the monitor personnel predetermine a control level for the flight management system, the on-board pilot may select a control mode, so that in accordance with control data given by the pilot and sensor subsystem data information, the flight management system may cooperate to implement and achieve a corresponding control process on the connected combination control object according to a control law given by the control level and a control function thereof.

Figure 7:
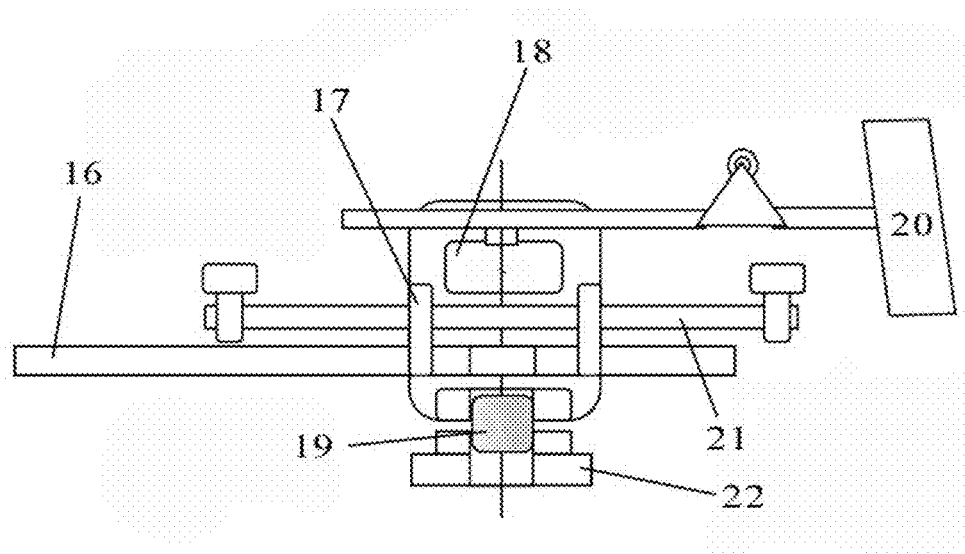
FIG. 7 is a schematic view of an aileron operating lever and a rudder stock converter (neutral position)
Figure 8:
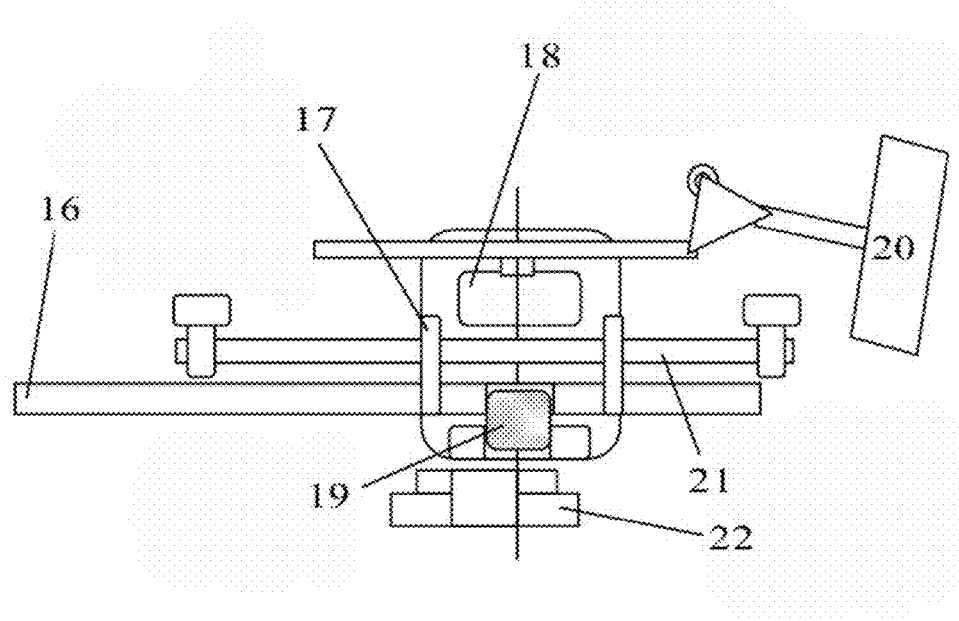
FIG. 8 is a schematic view of an aileron operating lever and a rudder stock converter (release displacement)
Figure 9:
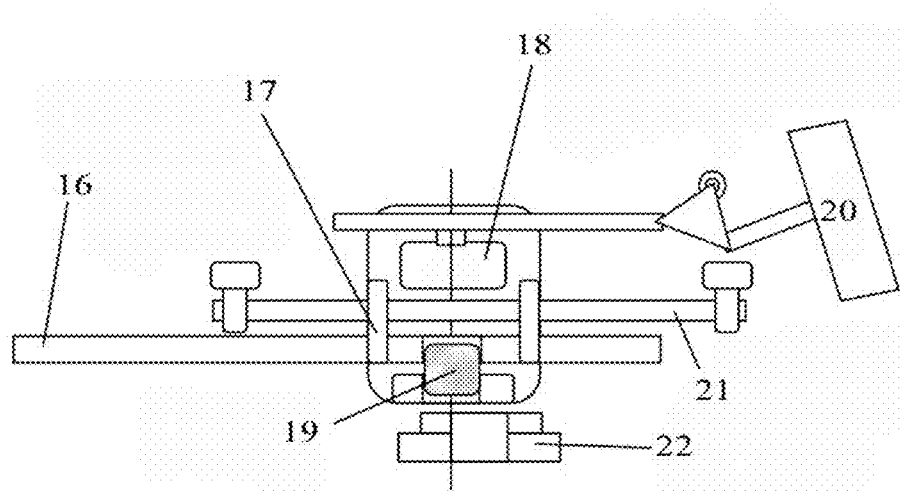
FIG. 9 is a schematic view of an aileron operating lever and a rudder stock converter (aileron deflexion)

The manual mode of the aircraft 1 may adopt a digital three-axis redundancy telex manipulation system. See FIG. 3. As shown in FIGS. 7, 8 and 9, it is a method of maintaining mechanical transmission of an aileron which uses a manual mode of a telex manipulator. For the aileron manipulation mechanism therein, a traditional airplane operating lever mechanism (soft or hard) is taken as an aileron operating lever 16. One end is connected with an output end of an aileron 20 of a telex manipulator, but it retains a function of manipulation acts being converted into manipulation instructions of electrical signals via a converter to be transmitted to the flight management computer. The other end is connected with a servo control mechanism of a pneumatic control plane of the aileron, so that the control mechanism is serially coupled between the pneumatic control plane of the aileron and the telex manipulator. In order to achieve cooperative manipulation by the flight management system and the telex manipulator, the control mechanism is installed on a rudder stock converter 17. A conversion mechanism of the rudder stock converter 17 may select an electrical mechanism, a hydraulic mechanism, an electromagnetic mechanism or combination thereof, is connected with the flight management system and accepts management. In the use of manipulation, only at the time of converting the control mode, the flight management system needs to control the pneumatic control plane of the aileron to return to a neutral position and perform conversion. When a fatal error, such as power supply being stopped, occurs in the aircraft 1 or the flight management system, the rudder stock converter 17 will be in a state of being released from a platform fixation base 22 of a platform structure system.

When the manual mode is selected, the flight management system first controls the pneumatic control plane of the aileron to return to the neutral position and causes the rudder stock converter 17 to be released from the platform fixation base 22. At this time, the conversion bolt 19 clamps the aileron operating lever 16, so that an aileron control mechanism and lever system 18 and the rudder stock converter 17 may move along a slide guide 21 together with the aileron operating lever 16. Meanwhile, the pneumatic control plane of the aileron maintains connection with the aileron control mechanism and lever system 18, still accepts combination control by the flight management system.

When the automatic mode is selected, the flight management system first controls the pneumatic control plane of the aileron to return to the neutral position and causes the rudder stock converter 17 to be fastened with the platform fixation base 22. At this time, the conversion bolt 19 clamps the platform fixation base 22, so that the aileron control mechanism and lever system 18 and the rudder stock converter 17 can not move together with the aileron operating lever 16. Meanwhile, the pneumatic control plane of the aileron maintains connection with the control mechanism, only accepts combination control by the flight management system.

When the semi-automatic mode is selected, conversion of the rudder stock converter 17 by the flight management system is the same as that in the automatic mode. After conversion into the semi-automatic mode, the pneumatic control plane of the aileron only accepts combination control by the flight management system.

In FIG. 7: neutral position (the aileron operating lever 16 may move);

In FIG. 8: release displacement (the aileron operating lever 16 moves to the right);

In FIG. 9: aileron deflexion (the aileron operating lever 16 moves to the left).

The ground monitor station and the method of controlling the whole flight process thereof are unique features which form the complete flight control ability of the cooperatively-driven airplane. They are expressed by the following respective details (items), but the order of description does not denotes the order of operation.

1. the monitor personnel of the ground monitor station include people at several kinds of speciality posts and have cross-specialty mixing ability, one is a ground control area director or controller, one is a flight director, a flight operator and a link surveillant, one is a flight instructor and a manager, the monitor personnel have necessary qualification according to relevant laws. According flight needs, posts of the monitor personnel are distributed at some sites, but are not only limited thereto, one is a present airport control area tower, one is a flight monitor seat of the aircraft 1, one is a remote airport and ground control area.

2. the ground monitor station includes several functionalities: one is to be responsible for or participate in control and direction of flight activities of the aircraft 1 within a flight airspace and a holding pattern airspace of the airport of the aircraft 1, mutual adjustment and use of flight airspaces with an adjacent airport and management of an application for an temporary flight airspace, establishment of a cooperative system; one is to be responsible for or participate in definition of spaces of airspaces for training, test flight, low-altitude extreme low-altitude and night flight, etc, of the aircraft 1 in the airport area, coordination of detailed rules and regulations of the airport, management of the on-board pilot, wherein, definition of spaces of flight airspaces with respect to flight features of the aircraft 1 may be in accordance with safety and maximization principles, may set a plane operation area which takes the airport as a center and is multi-quadrant radial and avoids overlap and cross, set upper and lower basically corresponding respective altitude layer plane operation areas according to an altitude layering rule, to facilitate implementation of flight commands; one is that the monitor personnel and the on-board pilot are a team that performs the flight together, they need to follow basic rules of the flight together.

Figure 11:
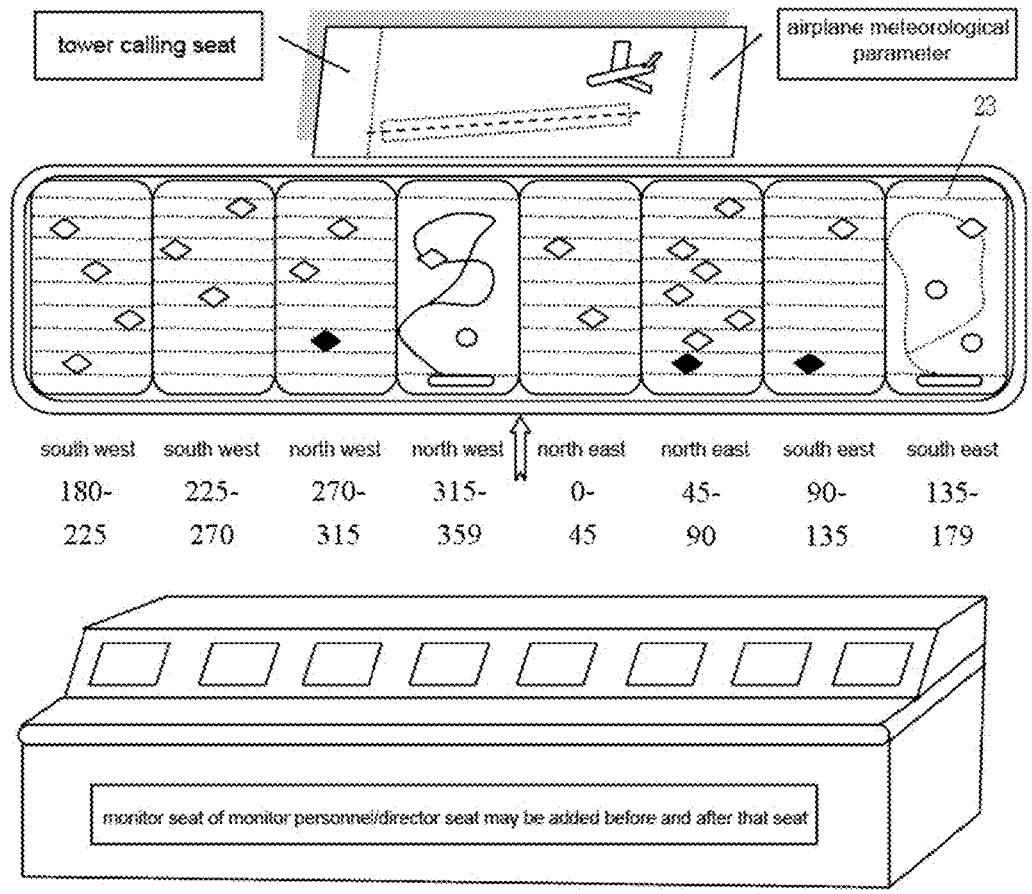
FIG. 11 is a schematic view of an integrated display.

As shown in FIG. 11, an integrated display of the ground monitor station includes a wide display and a plurality of monitor seats, this is a design method of the fixed type ground monitor station, there may be a plurality of schemes with different design details.

Within a flight command hall, the wide display and the plurality of monitor seats of the integrated display are arranged, working conditions of the monitor personnel such as directors or controllers, flight operators, etc, are provided. As shown in FIG. 11, in the Figure: an upper portion is a takeoff and landing area monitor picture. Thin sidelines in a picture in picture of a big-screen denote eight altitude layers, a diamond pattern denotes a position of an aircraft in a current altitude layer (flicker may be used to indicate that the aircraft has prompted an alarm), a black diamond denotes an aircraft in a holding pattern airspace (altitude layer colors may also be used to denote holding pattern airspaces), a curve denotes a planned flight path, a diamond on the curve is the current position of the aircraft, a rectangle below the curve denotes the airport, a dot denotes a state of another airplane in an alarm area (states of flight path s of other airplanes may be added).

In front of a picture of each operation quadrant, there is a corresponding monitor seat. When the number of the aircrafts 1 which fly simultaneously is large, it is recommended that each monitor seat corresponds to one operation quadrant, in order for the monitor personnel to focus their mind. The monitor personnel may use monitor seat apparatuses to communicate data information or control data with the pilot mutually, implement the monitor of the flight.

Figure 10:
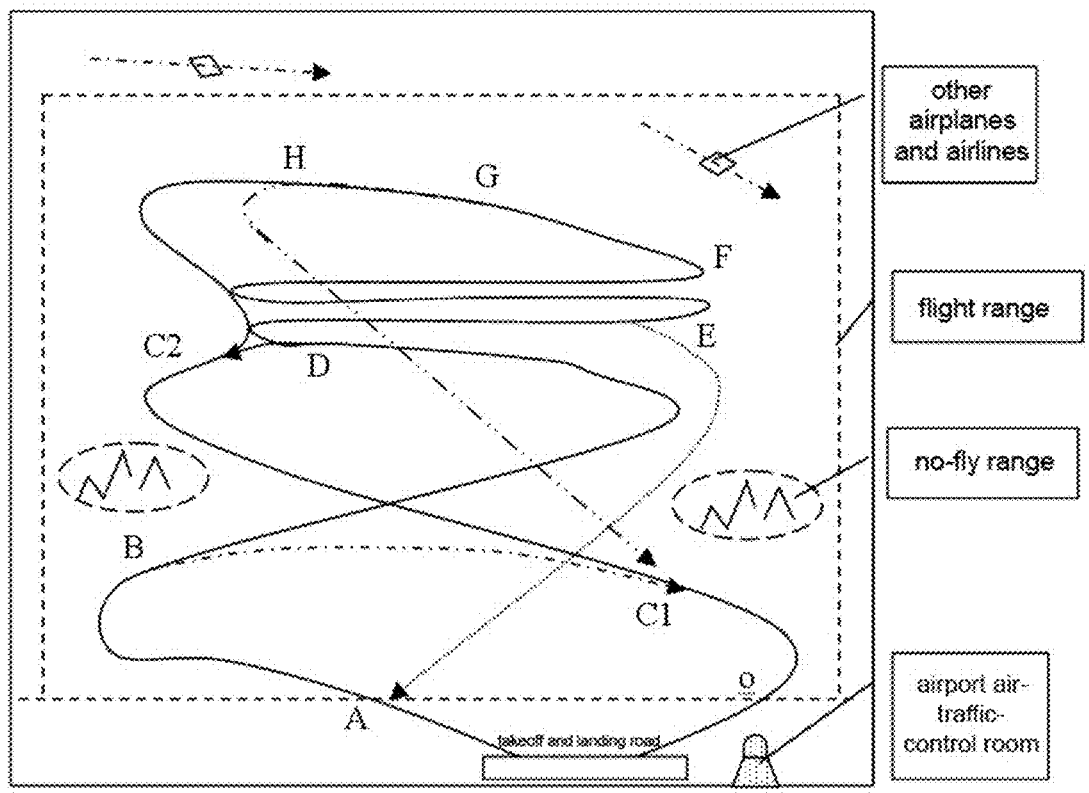
FIG. 10 is a CDU flight path check and flight path plan map.

The option display component CDU:

The pilot may perform an option operation on the CDU, achieve the flight path selection. As shown in FIG. 10. Explanation of way points and flight paths in the Figure:

(1). way point A: a path start point.

(2). way point B: a homeward voyage way point, wherein, a broken line segment BC1 is a homeward voyage flight path (a temporary flight path).

(3). way point C1: a homeward voyage entrance, way point C2, another homeward voyage entrance.

(4). D way point: a homeward voyage way point, wherein, a solid line segment DC2 is another homeward voyage flight path, D may be a start point of a sightseeing flight path DF.

(5). E way point: a current way point of reflight, a broken line segment EA is aft flight path of reflight to the flight path start point A.

(6). F way point: an end point of a sightseeing flight path, wherein, a line segment HD is a path of a supplementary flight from a sightseeing flight path DF to the start point D (not shown).

(7). G way point: a way point when a wait time starts, wherein, a line segment GH is a holding pattern.

(8). H way point: a path start point of an emergency homeward voyage, a broken line segment HCl is an emergency homeward voyage flight path.

(9). O way point: an approach flight path entrance, wherein, a line segment from O to a takeoff and landing road denotes an approach flight path.

(10). AO line: an area above it denotes an air stage area, an area below it denotes a landing stage area, its altitude from the ground is specified by relevant rules, it is generally 400 ft, or 150~200 m (11). solid line segment from way point A to O: a segment of an air stage of a predetermined flight path.

According to the pilot's selection or with respect to an emergency, it is possible to use a shortcut key on the option display component to select a homeward voyage instruction or a homeward voyage flight path, to input a next way point which the homeward voyage flight path will pass, or to select an emergency flight path, all of which can end the current flight to perform the homeward voyage.

The ground monitor station monitors the ongoing flight path conversion process on the aircraft 1, and when necessary or when there is an on-board application, may intervene to perform control.

Other Implementation Methods:

In a flight, the option display component may use a path instruction to generate a path automatically and quickly.

Control levels and control laws by which a pilot manipulates a flight are as shown in a Table 1.

TABLE 1 control levels and control laws by which a pilot manipulates a flight
(control laws: X denotes prohibiting manipulation, ✓⁻ denotes
limited manipulation, ✓ denotes normal manipulation)

control load (heading, altitude, turn is a combination manipulation)

| control level | level description | console heading | console altitude | console turn | console flap | console air brake | accelerator console | under carriage operation device | takeoff and landing gliding heading | Take off and landing gliding deceleration |
|---|---|---|---|---|---|---|---|---|---|---|
| 0 | riding | X | X | X | X | X | X | X | X | X |
| 1 | horizontal | ✓⁻ | X | ✓⁻ | X | X | X | X | X | X |
| 2 | fluctuation | ✓⁻ | ✓⁻ | ✓⁻ | X | X | ✓⁻ | X | X | X |
| 3 | homeward voyage | ✓ | ✓⁻ | ✓ | ✓⁻ | ✓⁻ | ✓ | X | X | X |
| 4 | landing | ✓ | ✓ | ✓ | ✓ | ✓ | ✓ | ✓⁻ | ✓⁻ | ✓⁻ |
| 5 | maneuver | ✓ | ✓ | ✓ | ✓ | ✓ | ✓ | ✓ | ✓ | ✓ |

Level description in the table:
riding: the pilot acts as a passenger;
horizontal: manipulate an equal-altitude horizontal varing-flight path flight;
fluctuation: manipulate a varing-altitude varing-flight path flight;
homeward voyage: manipulate a repeated varing-altitude varing-flight path flight (circling), may contain approach and go-around;
landing: manipulate approach and landing;
maneuver: is free maneuver manipulation within safety protection, is a bottom line of the big maneuvering flight of a cooperatively-driven airplane.

Embodiment 1

The on-board pilot may choose a driving method and an implementation method of the on-board flight management system performing flight control of the aircraft 1.

1. the flight management system is as shown in FIG. 3, the upper broken line block in the Figure: parameter sensor subsystem; middle broken line block: combination control and execution subsystem (control object: attitude, performance, range, level, mode); lower broken line block: monitor/manipulation subsystem (the cabin integrated avionic system is also called an electronic flight instrument system EFIS, CDU is included therein, in the manual mode, the flight management system communicates data information or control data with CDU and interacts with the pilot. In the automatic mode, it no longer interacts with the pilot, and only provides flight path data display).

The flight management system is connected with the telex and combination control load, the flight management system and the CDU operation interface (others by EFIS):

Respective on-board systems of the aircraft 1 are, as shown in FIG. 4, managed by the flight management system in a centralized way. The present embodiment focuses on on-board systems closely associated with the flight management system in the implementation method. The telex manipulator and the flight management computer are instruction generation functionalities which form the so-called telex manipulation system, can convert the pilot's manipulation acts into electrical signals by means of the telex manipulator to be transmitted to the flight management computer for computation, so as to generate control instructions and then distribute them to control loads. The present invention performs combination control of three main control loads in the flight, uses control levels to denote control laws of performing the combination control, lets them be able to act according to predetermined control modes, causes the flight of the aircraft 1 to form the needed flight track and vertical profile. The three control loads are the flight control system, the thrust control system and the takeoff and landing control system as well as servo mechanisms and loads controlled by them respectively, collectively called the combination control load.

As shown in FIG. 6, control modes of the combination control load are as follows:

(1). use CDU to select the manual mode, may use three manipulators to generate manual manipulation signals, then the flight management computer performs control of the three combination control objects.

(2). use CDU to select the automatic mode or the semi-automatic mode, in either case, the flight management computer performs control of the three combination control objects of flight, thrust and takeoff and landing according to control laws of control levels and predetermine flight paths, and blocks the manual signal path, invalidates manual operation by the three manipulators.

In the air stage, the former two are mainly controlled, and in the landing stage, three are simultaneously controlled. The flight management system and the pilot's human machine interface cabin integrated avionic system, wherein the emphasis is the option display component CDU as the human machine interaction interface, other electronic flight instrument EFIS of the aircraft 1 has an auxiliary functionality. The pilot by means of the CDU reads real time data information of respective on-board systems which the flight management system computes in a centralized way and distributes to be displayed for the pilot, and meanwhile, by an input flight plan on the CDU, or by selecting a control mode, transmits control instructions to the flight management system.

2. The Flight Plan Followed by the Flight and the CDU:

The flight plan or so-called flight task book, denotes a predetermined flight path, a flight range, a contingency plan, involved airports in one flight of the aircraft 1. Before the flight, the ground personnel put forward the flight plan, so that the pilot checks flight preparation. The flight plan is written in the CDU, the present invention thinks that a movable CDU is easy to use and facilitates scheduling the check flow, especially, before the flight, flight plans of a plurality of aircrafts 1 may be written in the CDU and check each other, an then be installed onto the cabin integrated avionic system.

3. A Driving Method which May be Selected by the Pilot, i.e. a Dynamic Flight Path and a Predetermine Flight Path, an Approach Flight Path of a Control Mode, a Manual Mode:

The pilot may choose three methods of performing the flight, i.e. three control modes. At the air stage, the manual mode is generally selected, the pilot manipulates the telex manipulator to perform the flight manually, the flight management computer and the combination control load control the flight, generate the dynamic flight path. The predetermine flight path and the approach flight path in the flight plan are mainly used by the automatic mode and the semi-automatic mode to control the flight. In the flight, by means of the CDU or the electronic flight instrument in the cabin integrated avionic system, e.g. a flight director, the pilot may see the difference between the dynamic flight path and the predetermine flight path, the approach flight path. Especially, at the landing stage, the pilot is required to must land according to the approach flight path, corrects the deviation of its dynamic flight path from the approach flight path in time, guarantees safe landing.

4. The Conversion Process of the Automatic Mode, the Semi-Automatic Mode, the Control Mode:

The pilot selects the automatic mode and the semi-automatic mode, the flight management system performs automatic control of the flight of the aircraft 1 according to the predetermine flight path, the approach flight path in the flight plan. When the manual mode is converted into the automatic mode or the semi-automatic mode, the flight management system performs a holding flight according to the predetermine time and the predetermine flight path set by the ground personnel, waits for the pilot to use the shortcut key or other methods to convert the control mode, the aircraft 1 continues the straight horizontal flight along the current way point of the dynamic flight path according to the setting of the predetermined flight path, or performs the circulating horizontal flight from the current way point. If, after the predetermine time, the pilot does not make his choice, the aircraft 1 automatically control the flight according to the predetermined flight path. Such a case includes the pilot being unfamiliar with operations. If the semi-automatic mode is selected, the present invention allows the pilot to actively perform operations of flight path deviation adjustment and control at the air stage, actively perform operations of flight path correction adjustment and control at the landing stage, in order to satisfy the pilot's various complex flight path flight needs in the air.

5. The CDU Application, the Predetermined Flight Path, the Temporary Flight Path, the Homeward Voyage Flight Path, the Emergency Homeward Voyage:

The CDU may be provided for the pilot to select the control mode, select various flight paths which may be performed by the flight management system. The predetermined flight path may be checked, including the flight path of the flight omnidistance, the homeward voyage flight path, the emergency flight path, the go-around flight path, as well as the holding pattern of a predetermined time. A temporary flight path preset by the pilot may be selected, a flight path may also be written temporarily on-board by using the CDU. There is a kind of predetermined flight path or temporary flight path, which may be called a sightseeing flight path. It is a flight path by which the pilot wants to observe the ground at the air stage, may be an airline a flight path of a back and forth flight, a geometrical pattern. According to the automatic control flight principle, if a segment of a flight path is designated a start point (entrance) and an end point, the flight management system can look for and fly to the point automatically, and fly according to the flight path. The pilot may also select a reflight, a supplementary flight, even a homeward voyage at the air stage.

6. The Pilot's Interaction with the Ground Personnel, a Flight Range, a No-Fly Range, a Control Range:

When the pilot does not select the control mode after a waiting time, the monitor personnel of the ground monitor station can monitor such a situation, may communicate with the pilot by using the voice, and when necessary, the monitor personnel may actively select a new control mode for the pilot. The flight plan specifies the flight range at each time, the temporary flight path written by the pilot at the air stage have to comply with the range, and meanwhile, the flight management system will automatically limit the aircraft 1 so that the aircraft 1 can only fly within the flight range. The flight range includes highest and lowest flight heights, flight width, as well as a flight speed and heading rule after a flight range prompt. Correspondingly, a no-fly range is a no-fly zone within the flight range, is generally determined according to basic rules of the flight, may supplement limits which are considered special by the flight plan, includes a city, a mountainous area or a meteorologically dangerous area, etc. The application of the combination of the flight range and the no-fly range may help the flight management system generate the required automatic flight path.

Figure 12:
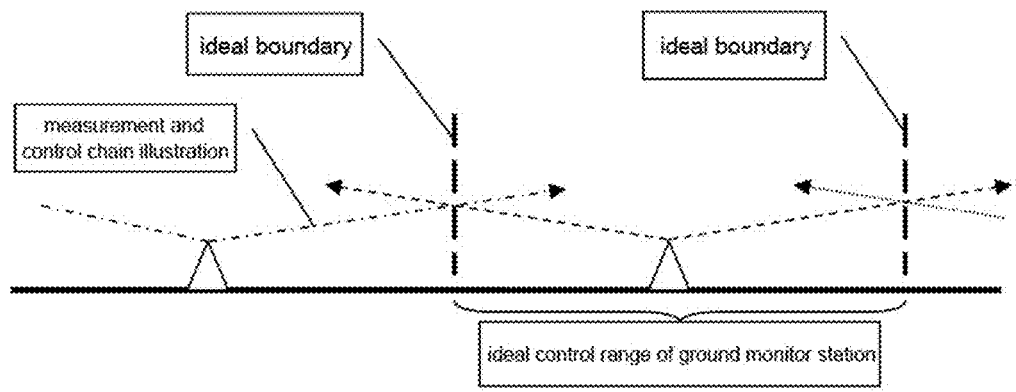
FIG. 12 is a schematic view of a vertical section of a control range.
Figure 13:
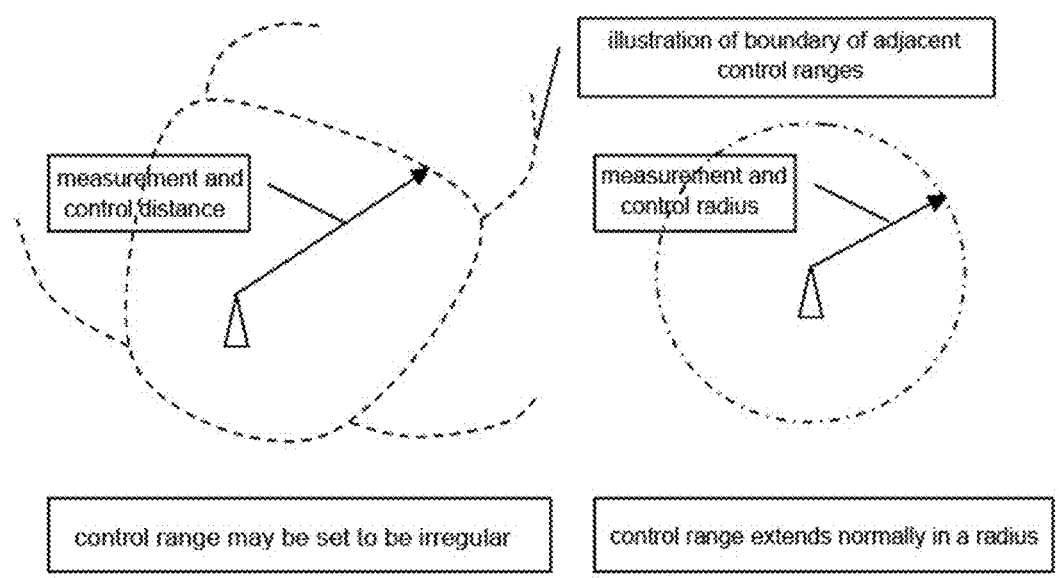
FIG. 13 is a schematic view of a horizontal section of a control range.

The ground monitor station selects a ground monitor station for an aircraft by setting a control range, this method may change a case of traditionally selecting a controlled aircraft 1 in accordance with a physical function range of a ground data link. Generally, one aircraft 1 is connected with one ground monitor station, it is also possible to form ground and air connection between a plurality of ground monitor stations and one aircraft 1, or between a plurality of aircrafts 1 and one ground monitor station. Boundary of adjacent control ranges of the plurality of ground monitor stations is shown in FIGS. 12 and 13. This pursues multi-station multi-aircraft high density measurement and control and information transmission application, especially achieves standardization and economization of the ground monitor stations.

Embodiment 2

An implementation method in which the ground monitor station and the monitor personnel and the on-board pilot jointly perform the flight control of the aircraft 1.

1. control management of the aircraft 1 by the ground monitor station (control levels, three ranges), a human machine interface CDU:

Before the flight, according to the on-board pilot's driving skill level, a control level is determined for the pilot and preinstalled onto the airplane or into the option display component, as a control law of the control object by the flight management system (as shown in Table 1). By issuing data information or uploading control information by means of the composite data chain on the ground monitor station, the monitor personnel may obtain real time information of the flight via the human machine interface, perform monitoring and control of the flight of the aircraft. In order to save data chain bandwidth resource, the flight management system may perform sort management and time-division issue on the issued data information. Usually, information of an air-traffic-control responder or ADS-B system (plain or coded) is issued, and in an emergency, an alarm given by the flight management system and associated data information are issued. By uploading control instructions, the monitor personnel may control the flight of the aircraft 1.

The human machine interface on the ground monitor station may adopt a computer display system. The present invention recommends to adopt an option display component CDU which is the same as that on the aircraft 1 and is configured with double interfaces. One is for the ground monitor station to install a CDU, one is for connecting a CDU of a simulation machine, so that the two CDUs may simultaneously be connected in a wired way to perform a check before the flight on the ground monitor station. Through the CDU interface, the monitor personnel may preinstall the control level, geographical information data of the flight range, the no-fly range and the control range to the flight management system before the flight, and may set a read-only attribute of preinstalled data information or control instructions.

2. Three Control Modes of the Ground Monitor Station, a Normal Flight and Emergency Handling:

The ground monitor station may also use three control modes to perform control of the flight of the aircraft. Manual, automatic and semi-automatic. Wherein, the semi-automatic mode may use deviation adjustment and control and correction adjustment and control at the air stage, and can only use correction adjustment and control at the landing stage.

The ground monitor station may monitor the aircraft flight state in real time, may also select to usually only accept a prompt or an alarm of the aircraft in an emergency, and at the same time, accept relevant issued telemetering data information, and accordingly, help the pilot, or instruct the aircraft 1 to make a homeward voyage, an emergency homeward voyage, including requesting help from other ground monitor stations. Generally, the aircraft 1 has the control ability to automatically land according to approach flight paths of the present airport and a backup airport. In an emergency, when the airport approves, the aircraft may land according to an emergency flight path. Therefore, the present invention requires the cooperatively-driven airplane to have the required navigation accuracy, have the landing ability on the chosen airport (satisfying CATIIIC) according to RNP AR, it is possible to choose RNP AR APCH. In the ground control area, monitor resources of the control area may be scheduled to be shared, they are given to a control area so that the control area functions as a cooperative control station, monitors the flight of the aircraft 1, instructs to wait (in a special case of encounter in the air), or instructs a homeward voyage and a forced landing (when there is a request or an airborne alarm).

3. Monitor of the Flight of a Plurality of Aircrafts by the Ground Monitor Station, and an Integrated Display as Control Means:

In a permanent airport, a fixed type ground monitor station is generally selected, an integrated display is adopted therein, and it is abbreviated as a monitoring hall, and it is applicable to an airport where there is much takeoff and landing. A wide display of the integrated display may display a plurality of flight states in a centralized way, the monitor personnel may monitor the flights through the monitor seats. In order to cooperate with the airport in the monitor of the flight airspace subarea (quadrant), the wide display may adopt a plurality of pictures or picture in picture to monitor a plurality of aircrafts simultaneously. The picture in picture may show data information such as an altitude layer in which an aircraft 1 in a flight area is located, a flight state, states of other aircrafts, as well as unfolded flight airline paths, and control may be performed when watching the pictures. Wherein, the approach tower watches pictures of states of the takeoff and landing road, they may be monitored by respective seats or directors, controllers together, the monitor seats and the tower may communication and interact with each other.

4. Ability and Work of the CDU of the Ground Monitor Station:

With respect to a main ground monitor station, flight plan complete data and instruction information are installed within the CDU of the ground monitor station. This shows that it has the ability to perform the complete flight monitoring of the aircraft 1. Other assistance ground monitor stations assist in the flight monitoring. The CDUs thereof mainly have data or instruction necessary for monitoring and emergency.

Embodiment 3

A sport-type of a cooperatively-driven airplane is mainly applied to teaching flight training, sightseeing experience flight. There is a large number of this type of airplanes. It is representative. The aircraft with a single seat, two seats, four seats or less than 19 seats is mainly selected. Design methods and products thereof are compatible. And it may be extended into a business-type, especially a private business-type cooperatively-driven airplane. The design method of the sport-type is also substantially the same as those of a freight-type and an industry-and-agriculture-type cooperatively-driven airplane. With respect to the industry-and-agriculture-type airplane, the flight operated by the pilot may make use of the flexibility and random variation of the air operation, and works at the gliding stage of the airport.

A typical process of the flight by the sport-type cooperatively-driven airplane is as follows:

1. Flight Airspace

As for the takeoff and landing airport of the cooperatively-driven airplane, the flight airspace and the holding pattern airspace are defined, and mutual adjustment and use of flight airspaces with an adjacent airport is performed, the need of the monitoring of many flights is satisfied. It is possible to set a plane operation area which takes the airport as a center and is multi-quadrant radial and avoids overlap and cross (an irregular airspace may be displayed correspondingly in a quasi-quadrantal way), and set upper and lower basically corresponding respective altitude layer plane operation areas according to an altitude layering rule. Maximization of the flight airspace and safety are considered together, respective plane operation areas may be displayed in the monitoring hall, in order that the monitor seat implements flight commands.

2. Flight Plan and Monitoring Hall:

The ground personnel make the flight plan, write it within the option display component CDU. The flight plan mainly includes an airport of the present flight, a local navigation database, a control level, a division range (three ranges), a predetermined flight path, an emergency scheme, etc. Before the flight, a consistency check is performed between the CDU flight plan of the pilot and the flight plan of the ground monitor station, and the read-only attribute of data and instruction is given. The CDU also stores the local commonly used data, including a performance database, a control function (which may be written in an on-board apparatus), a relevant airport approach flight path base, etc. When the aircraft flies, the ground monitor station compares real time data information issued from the airplane with the flight plan data, automatically gives a prompt or an alarm about the difference. On the display screen of the monitoring hall, the flight of the aircraft is denoted as movement or flicker, is superimposed within the plane operation area displaying the altitude layer. The monitor personnel may, at any time, click and open any one aircraft to display its flight path flight, states of other airplanes. The monitor personnel may send control instructions to any one aircraft. The monitoring hall is in communication with the present airport and a relevant airport ground control area, they can cooperate with each other to perform the monitoring of the flight.

3. Selection of Control Level and Flight

The ground personnel or the flight manager will determine the pilot's control level according to his driving skill. The control law of the aircraft combination control load is determined by the control level. Control of a corresponding level is performed on respective flight control mods selected by the pilot, by the flight management system according to the control level, so as to guarantee the driving safety. The most basic control level treats the pilot as a passenger, flies automatically during the entire journey from takeoff to landing according to a predetermined flight path. It is the same as the automatic flight of the automatic mode selected by the pilot, and the CDU does not accept a case where the pilot selects the manual mode. Other control levels allow the pilot to perform a corresponding flexible flight, and the pilot may select the automatic mode at any time, to guarantee air safety.

4. Transformation of Monitoring of Flight Training and Business Trip

Ordinary people take part in the flight, play the role of the pilot, begin from the most basic driving training, even simply ride to experience the flight. The flight instructor may not ride in the airplane, and the ground monitor personnel may work as the flight instructor. The pilot may listen to a voice prompt during the process of on-vehicle manipulation. Record data of manipulation may be played back on the ground, which shows a difference between the dynamic flight path and the predetermined flight path. The pilot obtains teaching and explanation from the teacher, makes a comparison by himself, learns from it. When the pilot is familiar with the flight to a certain degree, he may apply for a control level of higher difficulty. The highest level is up to a big maneuvering flight by oneself, a formation flight. The ground monitor station always performs monitoring or recording of the flight of any cooperatively-driven airplane. When the pilot's skill reaches a certain driving level, he may drive by himself to perform a sightseeing flight. Even the manager helps the pilot apply for a long distance trip flight plan, or the pilot performs a business flight by himself. The ground monitor station still performs the monitoring during the entire journey to guarantee the safety.

5. Monitoring of Freight Express Delivery, Industry-and-Agriculture Flight

Ordinary people may perform an industry-and-agriculture operation flight. After certain driving skill training, the cooperatively-driven airplane service airport may provide an application for an industry-and-agriculture operation flight plan, to provide CDU preparations for the flight before the flight. The monitoring hall performs the monitoring guarantee for the flight omnidistance and the emergency process. Especially with respect to the flight service of the freight and the express delivery, the pilot may perform the flight by himself after deviation adjustment operation training of takeoff and landing and gliding. Meanwhile, the driving level requirements necessary for a remote sensing operation, a rescue operation are higher, but they are more simple than the driving skill of a general aviation flight and are guaranteed by the ground monitoring.

Of course, the above is simply a specific application example of the present invention. The present invention also has other embodiments. All technical solutions, which adopt equivalent substitutions or equivalent transformations, fall within the protection scope claimed by the present invention.

What is claimed is:

1. A method for designing a cooperatively-driven aircraft system, comprising the following steps:
   configuring an aircraft with a telex manipulation system for a pilot,
   defining a ground monitor and control system as a working environment, and
   configuring a data link for connecting an aircraft with a ground monitor station;
   wherein
   the aircraft and the ground monitor and control system apparatus form the cooperatively-driven aircraft system, the cooperatively-driven aircraft system has complete information and control functions between air and ground;
   the cooperatively-driven aircraft system comprises three parts:
   the aircraft, the ground monitor and control system and the data link, the pilot uses the telex manipulation system to fly the aircraft, the telex manipulation system has a flight management system as a center;
   configuring the flight management system for integrating a telex manipulator, a parameter sensor and a control execution system,
   providing different control modes of performing a flight for the pilot, and
   achieving an automatic flight independent of the pilot's sense;
   configuring the flight management system for achieving a complete function of providing an automatic flight control for the aircraft, wherein the flight management system is a flight task management computer system;
   using a flight management computer of the flight management system in the telex manipulation system for achieving a conversion channel between a manual mode and an automatic mode;
   in the working environment, monitoring and controlling the flight of the aircraft by the data link and corresponding apparatuses; the data link is a radio link providing a control instruction or a data information linkage between the air and the ground;
   through the cooperatively-driven aircraft system formed by the aircraft and the ground monitor station together, providing different control levels and control modes of performing the flight for an on-board pilot, comprising the manual mode, a semi-automatic mode and an automatic mode on-board, wherein the ground monitor personnel of the ground monitor station perform a selectable flight control mode without depending on the on-board pilot, comprising the manual mode, the semi-automatic mode and the automatic mode;

in the flight management system, constructing, accepting or installing a data chain connection with the ground monitor station; processing and executing data and instruction; introducing the control levels to provide control laws for the flight management system to control a combination control object of the flight management; three convertible control modes, comprising the manual mode, the semi-automatic mode and the automatic mode, are set for the flight management system, so that different driving methods are provided for the pilot; when the manual mode is selected for the flight management system, the flight management system becomes the telex manipulation system, and when the semi-automatic mode and the automatic mode are selected, the flight management system becomes a task management system;

all of the three control modes achieve a control of the combination control object by means of the flight management system; one implementation method for achieving the control of the combination control object by means of the flight management system is, the ground monitor personnel predetermine the control level for the flight management system, the on-board pilot does not change the control level, but the on-board pilot selects the control mode, so that in accordance with control data given by the pilot and sensor subsystem data information, the flight management system cooperates to implement and achieve a corresponding control process on a connected combination control object according to a control law given by the control level and a control function thereof;

using the telex manipulator as a method of the manual mode; limiting an allowed amount of a deviation by a flight range; when the deviation reaches a limit and is maintained, a deviated flight path will go in a same direction and at a same altitude and at an equal distance, relative to a predetermined flight path;

designing a correction adjustment and control to correct a case where the aircraft deviates from the predetermined flight path in the automatic flight by use of a manipulation method of manually manipulating the telex manipulator or a control key, one manipulation generates one correction instruction corresponding to one adjustment quantity of a heading, and according to specific pneumatic characteristics of the aircraft and a pulse duration time of the correction instruction, determining a heading correction amount generated by one correction instruction; one key-press or a re-manipulation of the telex manipulator after the telex manipulator returns to the middle generates a new correction instruction, the heading correction amount accumulated for consecutive several times achieves a large change in the heading, and a correction of the heading achieves a correction of a flight path deviation; a range of the heading correction amount allowed by the accumulation is set.

2. The method for designing the cooperatively-driven aircraft system according to claim 1, wherein the flight range is executable control data, and an airspace range indicated by geographic coordinates, beyond which the aircraft is not allowed to fly; by data information of a navigation monitor system, the flight management system identifies and limits the flight range in the flight; the flight range comprises a path range and an airspace range, the flight path range is a certain width or height range set with respect to a flight path, numerical values are relatively fixed, and are denoted by relative coordinates with geographic coordinates of the flight path being used as a reference, flight path range is used as a safety interval for planning the flight path, and also used as a range of adjustment and control by the pilot on the flight path or remote control by the ground monitor personnel; the airspace range is a limitation on all width or height ranges denoted by geographic coordinates in the flight, the airspace range is set with respect to each of the flights, or set and relatively fixed with respect to training around an airport, regular field operations or a traffic flight path flight airspace;

the ground monitor personnel predetermine the flight range for the flight management system; the flight range is not modified by an on-board personnel, and in the flight, the flight range is only modified by the ground monitor station at an original takeoff place;

the flight range has priority over an on-board manual mode, the semi-automatic mode and the automatic mode in the control power, one is that all of the flight paths are not allowed to fly beyond the flight range, and when the predetermined flight path is performed, a plan beyond the flight range will be prompted and refused by the system, one is that, in an execution, when the flight approaches the flight range, the flight management system automatically gives a prompt or an alarm, one is that when the flight reaches the flight range, the flight management system automatically evades according to a predetermined evasion heading or velocity, controls the aircraft to return within the flight range to perform a holding flight, or automatically perform a homeward voyage.

3. The method for designing the cooperatively-driven aircraft system according to claim 2, wherein by setting a control range and setting a mutual communication between the aircraft and the ground monitor station of a control range of the aircraft, the mutual communication and an interoperation relation is constructed between the control range and the aircraft, and by mutual communication of a ground and air network of the control range, the transmission relation with the ground monitor station is constructed, over-the-horizon networking measurement and control and communication of the aircraft is achieved;

when the aircraft flies from one control range into another adjacent control range, after an on-board composite data chain of the aircraft exits boundaries of an original control range, the on-board composite data chain starts to establish a measurement and control connection with the ground monitor station within a new control range, or called selective mutual communication, a previous ground monitor station interrupts mutual communication with the aircraft;

when an aircraft flight space extends beyond the control range and does not extend into the new control range, as long as an antenna of the on-board composite data chain has controllable level strength with respect to the aircraft, the aircraft continues to be measured and controlled until the aircraft enters other already set control range, and a ground monitor station within a new control range airspace performs measurement and control connection with the aircraft;

when the aircraft flies within an airspace with no control range being set and no new ground monitor station connects and measures and controls after a set delay time, the ground monitor station of the original takeoff place re-determine the set delay time, or extend the control range into the traffic flight path flight airspace of the aircraft, the aircraft still receives measurement and control from the ground monitor station of the previous control range, or performs a process according to a predetermined emergency scheme, comprising the aircraft automatically performing homeward voyage;

by setting the control range, priorities with respect to measurement and control of the aircraft and relay leaps of measurement and control between the ground monitor stations of the adjacent control ranges are established, thereby forming a method of mutual communication and interoperation; such a method of applying control ranges in combination between the aircraft and the ground monitor stations determines establishment of a mutual communication and interoperation relation between the ground monitor stations with a same performance and one or more aircrafts, an application of a multi-leap over-the-horizon data chain is constructed between ground monitor stations having the ground and air network communication at a long distance.

4. A cooperatively-driven aircraft system, wherein the cooperatively-driven aircraft system comprises an aircraft, a movable ground monitor station or a fixed ground monitor station, a data link of a telemetering remote control and information transmission system or abbreviated as a data link of a composite data chain and a relay communication device;

a flight management system is disposed inside the aircraft, a pilot uses a telex manipulation system to perform a flight, the flight management system performs an automatic control of the flight in a signal activation way or in a flight task management way; the aircraft is connected to the movable ground monitor station or the fixed ground monitor station by means of a radio data link of the composite data chain, telemetering data information about the flight management system is issued to the movable ground monitor station or the fixed ground monitor station by means of the composite data chain, so that the ground monitor station monitors flight data or state of the aircraft; by means of the data link of the composite data chain, the movable ground monitor station or the fixed ground monitor station uploads control instructions or an executable predetermined flight path to the flight management system of the aircraft to perform control of the flight of the aircraft, achieves cooperative air and ground driving; a plurality of movable ground monitor stations or fixed ground monitor stations is connected in a ground wired connection way, or by means of the radio data link of the composite data chain, to form a mutually communicated network system; the composite data chains of the aircraft are allowed to open data communication connecting to the composite data chains, forming a data sharing local area network, the flight management system is a central system of an on-board system of the aircraft, is formed by a flight management computer and a control apparatus; the flight management computer and units thereof in the flight management system are connected with the on-board system of the aircraft according to the following classification, to form a main operation system with mutual input and feedback;

a first one is that the flight management computer and the units thereof in the flight management system are connected with a navigation monitor system, an engine parameter sensor and an undercarriage/airplane wheel parameter sensor as parameter sensor subsystems, to obtain input of data information of relevant monitoring parameters;

a second one is that the flight management computer and the units thereof in the flight management system are connected with the composite data chain and a cabin integrated avionic system as monitor/manipulation subsystems, so that relevant data information and control data are communicated with each other for being displayed and operated on the aircraft, or are issued to the ground monitor station for use by the monitor personnel;

a third one is that the flight management computer and the units thereof in the flight management system are connected with a flight control system, a thrust control system and a takeoff and landing control system as execution subsystems, wherein they output control data, perform control of corresponding control objects, the flight management computer and units thereof may be used in combination with a computer of the flight control system and again is used in combination with a computer of the thrust control system and the takeoff and landing control system to use on-board computer resources reasonably;

a fourth one is that, units of the flight management computer in the flight management system, comprising an option display component or a control display component CDU, are on-board apparatuses or easily detachable mobile apparatuses, are human machine interaction interfaces for the pilot and the flight management computer, provide functions of displaying, inputting and modifying data or instructions.

5. The cooperatively-driven aircraft system according to claim 4, wherein subsystems integrated in the navigation monitor system comprise a navigation system, an automatic dependent surveillance-broadcast and air-traffic-control responding system, a voice communication system, a ground and air communication radio system and a ground landing guide on-board system;

the navigation system provides navigation data for the flight management system, integrating satellite and inertia combination navigation, satellite difference navigation, radio navigation of the composite data chain, an atmosphere data computer system, an attitude sensor, optional items of astronomy navigation and ground landing guidance, so that the flight management computer calculates navigation data;

the automatic dependent surveillance-broadcast or air-traffic-control responding system is connected with the flight management system, on the one hand, the automatic dependent surveillance-broadcast or air-traffic-control responding system sends real time data information to the cabin integrated avionic system, the real time data information is displayed, gives an alarm, or is recorded, meanwhile, by means of a data chain of the data information, the real time data information is directly sent to a ground control area for being monitored and managed and controlled by a ground controller; or by means of a line of sight or over-the-horizon link encoding of an on-board composite data chain, the real time data information is sent to the ground monitor station, and displays received navigation states of other airplanes around the aircraft; on the other hand, data information of the automatic dependent surveillance-broadcast or air-traffic-control responding system is used to obtain dangerous states in which other airplanes nearby approach the present airplane, the flight management system calculates an air anti-collision strategy of the aircraft and an evasion flight path, establishes a control ability of air anti-collision of the airplane, forms control laws of air automatic anti-collision of the airplane;

the voice communication system communicates with a ground control area voice radio by an on-board voice radio through voice encoding via the line of sight or over-the-horizon link of the composite data chain, the line of sight or over-the-horizon link of the on-station composite data chain performs voice encoding correspondingly, so that the ground monitor station performs voice communication with the ground control area or the ground monitor station along a way, with the flight of the aircraft;

the on-board ground and air communication radio system communicates with the ground independently; a light of the on-board ground and air communication radio system indicates that the system is connected with the flight management system.

6. The cooperatively-driven aircraft system according to claim 4, wherein the composite data chain connected with the aircraft is divided into two parts of an on-board composite data chain and an on-station composite data chain, and the two parts are connected together through the radio data link, the on-board composite data chain is connected with the flight management system and the cabin integrated avionic system; the flight management system is connected with the on-board composite data chain, issues data information of respective on-board systems connected with the flight management computer and a calculated control data to the ground monitor station by means of the on-board composite data chain; the ground monitor station is connected with the on-station composite data chain, and by means of the on-station composite data chain, uploads the data information or control data of the ground monitor station to the flight management system for computation or being distributed to the connected on-board system, so that a method of ground and air manipulation is constructed.

7. The cooperatively-driven aircraft system according to claim 4, wherein the flight control system comprises the computer of the flight control system, a controller, a first control mechanism, a control object connected to the first control mechanism, control of respective pneumatic control planes is performed to achieve control of the attitude and the flight path of the aircraft; the thrust control system comprises a controller and a second control mechanism, and a control object connected to the second control mechanism, a thrust of an engine is controlled to cooperate with the flight control system to achieve control of a flight path profile and a flight speed of the aircraft; the takeoff and landing control system comprises a controller and a third control mechanism, and a control object connected to the third control mechanism, takeoff and landing control system cooperates with the flight control system to achieve control of landing and gliding of the aircraft; the flight management system performs combination control on the flight control system, the thrust control system and the takeoff and landing control system according to a control level or a control mode.

8. The cooperatively-driven aircraft system according to claim 4, wherein a system structure of the movable ground monitor station or the fixed ground monitor station is as follows: the system structure comprises an on-station composite data chain, a plurality of monitor seats and a computer display; the system structure further comprises an integrated display of a monitoring hall watched by all the monitor personnel, provides navigation computation data, has a function of an option display component CDU, provides a CDU installation interface, corresponding on-station data encoding and decoding, data processing and distribution, air-traffic-control state and meteorological information display, voice communication, an apparatus for giving an alert and an alarm, and working conditions; wherein, the CDU installation interface of the option display component CDU of the ground monitor station is the same as the CDU installation interface of the on-board option display component CDU, flight plan data is pre-installed in the option display component CDU, and before the flight, on the ground monitor station, the pilot completes read and check on a flight plan.

* * * * *